US011562283B2

(12) United States Patent
Coady et al.

(10) Patent No.: US 11,562,283 B2
(45) Date of Patent: Jan. 24, 2023

(54) PERFORMING QUANTUM FILE COPYING

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

(*) Notice: Subject to any disclaimer, the term of this patent is extended or adjusted under 35 U.S.C. 154(b) by 153 days.

(21) Appl. No.: 16/912,045

(22) Filed: Jun. 25, 2020

(65) Prior Publication Data

US 2021/0406747 A1  Dec. 30, 2021

(51) Int. Cl.
| G06F 7/00 | (2006.01) |
| G06N 10/00 | (2022.01) |
| G06F 16/16 | (2019.01) |
| G06F 16/17 | (2019.01) |

(52) U.S. Cl.
CPC ............. G06N 10/00 (2019.01); G06F 16/16 (2019.01); G06F 16/1734 (2019.01)

(58) Field of Classification Search
CPC .... G06F 16/16; G06F 16/1734; G06F 16/122; G06F 16/2379; G06N 10/00
USPC .................. 707/691, 705, 999.003, 741, 784
See application file for complete search history.

(56) References Cited

U.S. PATENT DOCUMENTS

| 7,451,292 B2 | 11/2008 | Routt |
| 7,639,035 B2 | 12/2009 | Berkley |
| 7,853,011 B2 | 12/2010 | Kuang et al. |
| 8,102,185 B2 | 1/2012 | Johansson et al. |
| 8,434,027 B2 | 4/2013 | Jones |
| 8,600,051 B2 | 12/2013 | Noh |
| 8,959,115 B2 | 2/2015 | Marathe |
| 9,264,226 B2 | 2/2016 | Harrison et al. |
| 9,495,644 B2 | 11/2016 | Chudak et al. |

(Continued)

FOREIGN PATENT DOCUMENTS

| CN | 105164704 B | 7/2018 |
| CN | 109816112 A | 5/2019 |

(Continued)

OTHER PUBLICATIONS

Barnum, H. et al., "Authentication of Quantum Messages," Proceedings of the 43rd Annual IEEE Symposium on Foundations of Computer Science, Nov. 2002, IEEE, 10 pages.

(Continued)

*Primary Examiner* — Md I Uddin
(74) *Attorney, Agent, or Firm* — Dority & Manning, P.A.

(57) ABSTRACT

Performing quantum file copying is disclosed herein. In one example, upon receiving a request to copy a source quantum file comprising a plurality of source qubits, a quantum file manager accesses a quantum file registry record identifying the plurality of source qubits and a location of each of the plurality of source qubits. The quantum file manager next allocates a plurality of target qubits equal in number to the plurality of source qubits, and copies data stored by each of the source qubits into a corresponding target qubit. The quantum file manager then generates a target quantum file registry record that identifies the plurality of target qubits and their locations. In some examples, a quantum file move operation may be performed by deleting the source quantum file after the copy operation, and updating the target quantum file registry record with the same quantum file identifier as the source quantum file.

18 Claims, 16 Drawing Sheets

(56) References Cited

U.S. PATENT DOCUMENTS

| | | | |
|---|---|---|---|
| 9,509,506 | B2 | 11/2016 | Hughes et al. |
| 9,774,401 | B1 | 9/2017 | Borill |
| 9,847,913 | B2 | 12/2017 | Kanda et al. |
| 9,887,976 | B2 | 2/2018 | Hughes et al. |
| 10,331,658 | B2 | 6/2019 | Pennefather et al. |
| 10,592,216 | B1 | 3/2020 | Richardson et al. |
| 2003/0121028 | A1 | 6/2003 | Coury et al. |
| 2012/0093521 | A1 | 4/2012 | Harrison et al. |
| 2013/0308956 | A1 | 11/2013 | Meyers et al. |
| 2014/0365843 | A1 | 12/2014 | Ashikhmin |
| 2016/0071021 | A1 | 3/2016 | Raymond |
| 2017/0351974 | A1 | 12/2017 | Rose et al. |
| 2018/0091440 | A1 | 3/2018 | Dadashikelayeh et al. |
| 2018/0144262 | A1 | 3/2018 | Roetteler et al. |
| 2018/0365585 | A1* | 12/2018 | Smith ............... G06F 9/5027 |
| 2019/0042971 | A1 | 2/2019 | Zou |
| 2019/0179730 | A1 | 6/2019 | Geller et al. |
| 2020/0074346 | A1 | 3/2020 | Griffin et al. |
| 2020/0125402 | A1 | 4/2020 | Griffin et al. |
| 2020/0184025 | A1 | 6/2020 | Horii et al. |
| 2020/0184031 | A1 | 6/2020 | Horii |
| 2020/0201655 | A1* | 6/2020 | Griffin ............... G06N 10/00 |
| 2020/0227522 | A1 | 7/2020 | Leipold et al. |
| 2020/0313063 | A1 | 10/2020 | Pollanen et al. |
| 2020/0374211 | A1 | 11/2020 | Griffin et al. |
| 2020/0387821 | A1 | 12/2020 | Griffin et al. |
| 2021/0027188 | A1 | 1/2021 | Nickerson et al. |
| 2021/0036846 | A1 | 2/2021 | Grice et al. |
| 2021/0058243 | A1 | 2/2021 | Starodubtsev |
| 2021/0303155 | A1* | 9/2021 | Meister ............ G06F 11/2094 |

FOREIGN PATENT DOCUMENTS

| | | | |
|---|---|---|---|
| JP | 6465876 | B2 | 2/2019 |
| WO | 2016206498 | A1 | 12/2016 |
| WO | 2018111242 | A1 | 6/2018 |

OTHER PUBLICATIONS

Bushwick, S., "New Encryption System Protects Data from Quantum Computers," Scientific American, Oct. 8, 2019, https://www.scientificamerican.com/article/new-encryption-system-protects-data-from-quantum-computers/, 5 pages.

Chen, S., "What if Quantum Computers Used Hard Drives made of DNA?" Wired, Mar. 15, 2017, https://www.wired.com/2017/03/quantum-computers-used-hard-drives-made-dna/, 10 pages.

Choi, C., "A Data Bus for Quantum Computers," IEEE Spectrum, Nov. 9, 2017, https://spectrum.ieee.org/tech-talk/computing/hardware/a-quantum-bus-for-quantum-computers, 3 pages.

Gühne, O., et al., "Entanglement detection," Physics Reports, vol. 474, No. 1, Feb. 27, 2009, 90 pages.

Lee, C., "New form of qubit control may yield longer computation times," Ars Technica, Jan. 26, 2018, Wired Media Group, 5 pages.

Mina, M., et al., "EntangleNet: Theoretical Reestablishment of Entanglement in Quantum Networks," Applied Science, vol. 8, Issue 10, Oct. 16, 2018, 17 pages.

Pathumsoot, P., et al., "Modeling of Measurement-based Quantum Network Coding on IBM Q Experience Devices," arXiv: 1910.00815v2 [quant-ph], Nov. 12, 2019, 10 pages.

Schoute, E., et al., "Shortcuts to Quantum Network Routing," Jul. 9, 2016, available online at https://obj.umiacs.umd.edu/extended_abstracts/QCrypt_2016_paper_203pdf, 2 pages.

Sillanpaa, M. et al., "Coherent quantum state storage and transfer between two phase qubits via a resonant cavity," Nature, vol. 449, Sep. 2007, Nature Publishing Group, pp. 438-442.

Toyoizumi, H., "Performance Evaluation of Quantum Merging: Negative Queue Length," Waseda University, accessed Apr. 2020 from http://www.f.waseda.jp/toyoizumi/research/papers/Performance%20Evaluation%20of%20Quantum%20Merging%20Negative.pdf, 5 pages.

Yamasaki, H. et al., "Quantum State Merging for Arbitrarily Small-Dimensional Systems," IEEE Transactions on Information Theory, vol. 65, No. 6, Jun. 2019, IEEE, pp. 3950-3972.

Yang, C., et al., "Entanglement generation and quantum information transfer between spatiallY-separated qubits in different cavities," New Journal of Physics, vol. 15, Nov. 1, 2013, 19 pages.

Non-Final Office Action for U.S. Appl. No. 15/930,025, dated Oct. 1, 2021, 10 pages.

Non-Final Office Action for U.S. Appl. No. 16/859,571, dated Oct. 28, 2021, 9 pages.

Notice of Allowance for U.S. Appl. No. 16/227,747, dated Jun. 10, 2021, 7 pages.

Cheng, S.T. et al., "Quantum Switching and Quantum Merge Sorting," IEEE Transactions on Circuits and Systems I: Regular Papers, vol. 53, Issue 2, Feb. 2006, IEEE, 10 pages.

Whitehouse, L., "Data deduplication methods: Block-level versus byte-level dedupe," Nov. 24, 2008, https://www.techtarget.com/searchdatabackup/tip/Data-deduplication-methods-Block-level-versus-byte-level-dedupe, 2 pages.

Applicant-Initiated Interview Summary for U.S. Appl. No. 15/930,025, dated Dec. 17, 2021, 3 pages.

Non-Final Office Action for U.S. Appl. No. 16/912,091, dated Jan. 27, 2022, 14 pages.

U.S. Appl. No. 15/930,025, filed May 12, 2020.
U.S. Appl. No. 16/884,928, filed May 27, 2020.
U.S. Appl. No. 16/859,571, filed Apr. 27, 2020.
U.S. Appl. No. 16/912,091, filed Jun. 25, 2020.
U.S. Appl. No. 16/912,200, filed Jun. 25, 2020.
U.S. Appl. No. 16/909,477, filed Jun. 23, 2020.

* cited by examiner

PERFORMING QUANTUM FILE COPYING

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to programmatically manipulate quantum files comprising a plurality of qubits will be desirable.

SUMMARY

The examples disclosed herein implement a quantum file management system that performs copying of quantum files that each comprise a plurality of qubits. Upon receiving a request to copy a source quantum file comprising a plurality of source qubits, a quantum file manager accesses a quantum file registry record that identifies both the plurality of source qubits and a location of each of the source qubits. The quantum file manager allocates a plurality of target qubits equal in number to the plurality of source qubits, and copies data stored by each of the source qubits into a corresponding target qubit. A target quantum file registry record that identifies the plurality of target qubits and their locations is then generated.

Some examples may provide that the quantum file manager first checks to ensure that the plurality of target qubits is available for allocation before performing the allocation operation, and/or may also check that each of the plurality of source qubits is in an entanglement state of not entangled and/or is not in a state of superposition before performing the copy operation. In some examples, after generating the target quantum file registry record, the sequence of the plurality of target qubits may be verified using a quantum file specification (e.g., a Quantum Assembly (QASM) file, as a non-limiting example) of the source quantum file. According to some examples, the quantum file manager may perform a quantum file move operation by deleting the source quantum file after performing the quantum file copy operation (e.g., by deleting the source quantum file registry record and deallocating the plurality of source qubits). The target quantum file registry record may then be updated to have a same quantum file identifier as the source quantum file registry record.

In another example, a method for performing quantum file copying is provided. The method comprises receiving, by a quantum file manager executing on at least one processor device, a request to copy a source quantum file comprising a plurality of source qubits into a target quantum file. The method further comprises accessing a source quantum file registry record corresponding to the source quantum file, the source quantum file registry record identifying the plurality of source qubits and a location of each source qubit of the plurality of source qubits. The method also comprises allocating a plurality of target qubits equal in number to the plurality of source qubits. The method additionally comprises copying data stored by each source qubit of the plurality of source qubits to a corresponding target qubit of the plurality of target qubits. The method further comprises generating a target quantum file registry record corresponding to the target quantum file, the target quantum file registry record identifying the plurality of target qubits and a location of each target qubit of the plurality of target qubits.

In another example, a quantum computing system for performing quantum file copying is provided. The quantum computing system comprises a quantum computing device that comprises a memory and at least one processor device coupled to the memory. The at least one processor device is to receive, by a quantum file manager executing on the at least one processor device, a request to copy a source quantum file comprising a plurality of source qubits into a target quantum file. The at least one processor device is further to access a source quantum file registry record corresponding to the source quantum file, the source quantum file registry record identifying the plurality of source qubits and a location of each source qubit of the plurality of source qubits. The at least one processor device is also to allocate a plurality of target qubits equal in number to the plurality of source qubits. The at least one processor device is additionally to copy data stored by each source qubit of the plurality of source qubits to a corresponding target qubit of the plurality of target qubits. The at least one processor device is further to generate a target quantum file registry record corresponding to the target quantum file, the target quantum file registry record identifying the plurality of target qubits and a location of each target qubit of the plurality of target qubits.

In another example, a computer program product is provided. The computer program product comprises a non-transitory computer-readable medium having stored thereon computer-executable instructions which, when executed, cause a processor device to receive, by a quantum file manager executing on the processor device, a request to copy a source quantum file comprising a plurality of source qubits into a target quantum file. The computer-executable instructions further cause the processor device to access a source quantum file registry record corresponding to the source quantum file, the source quantum file registry record identifying the plurality of source qubits and a location of each source qubit of the plurality of source qubits. The computer-executable instructions also cause the processor device to allocate a plurality of target qubits equal in number to the plurality of source qubits. The computer-executable instructions additionally cause the processor device to copy data stored by each source qubit of the plurality of source qubits to a corresponding target qubit of the plurality of target qubits. The computer-executable instructions further cause the processor device to generate a target quantum file registry record corresponding to the target quantum file, the target quantum file registry record identifying the plurality of target qubits and a location of each target qubit of the plurality of target qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
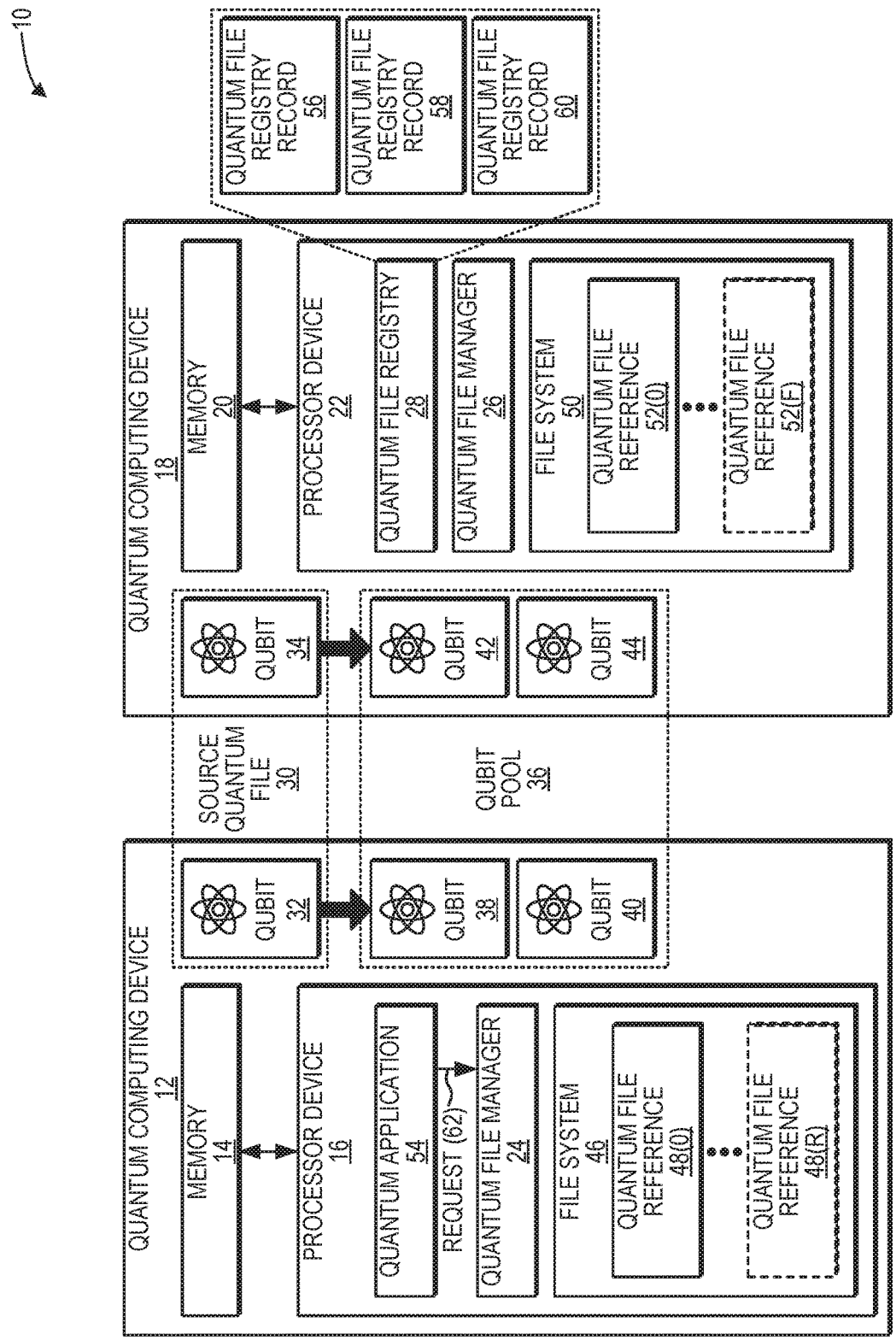
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. As quantum computing continues to increase in popularity and become more commonplace, an ability to programmatically manipulate quantum files comprising a plurality of qubits will be desirable.

In this regard, the examples disclosed herein implement a quantum file management system that performs copying of quantum files that each comprise a plurality of qubits. Upon receiving a request to copy a source quantum file comprising a plurality of source qubits, a quantum file manager accesses a quantum file registry record that identifies both the plurality of source qubits and a location of each of the source qubits. The quantum file manager allocates a plurality of target qubits equal in number to the plurality of source qubits, and copies data stored by each of the source qubits into a corresponding target qubit. A target quantum file registry record that identifies the plurality of target qubits and their locations is then generated.

Some examples may provide that the quantum file manager first checks to ensure that the plurality of target qubits are available for allocation before performing the allocation operation, and/or may also check that the plurality of source qubits are in an entanglement state of not entangled and/or that the plurality of source qubits are not in a state of superposition before performing the copy operation. In some examples, after generating the target quantum file registry record, the sequence of the plurality of target qubits may be verified using a quantum file specification (e.g., a Quantum Assembly (QASM) file, as a non-limiting example) of the source quantum file.

It is to be recognized that a file move operation may be accomplished by performing operations for copying a source file into a target quantum file, and then deleting the source file and assigning its identifier to the target file. Accordingly, some examples of the quantum file manager may perform a quantum file move operation by deleting the source quantum file after performing the quantum file copy operation (e.g., by deleting the source quantum file registry record and deallocating the plurality of source qubits). The target quantum file registry record may then be updated to have a same quantum file identifier as the source quantum file registry record.

FIG. 1 is a block diagram of a quantum computing system 10 according to one example. The quantum computing system 10 includes a quantum computing device 12 that comprises a system memory 14 and a processor device 16, and also includes a quantum computing device 18 that includes a system memory 20 and a processor device 22. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 may be close in physical proximity to one another, or may be relatively long distances from one another (e.g., hundreds or thousands of miles from one another). The quantum computing device 12 and the quantum computing device 18 operate in quantum environments, but can operate using classical computing principles or quantum computing principles. When using quantum computing principles, the quantum computing device 12 and the quantum computing device 18 perform computations that utilize quantum-mechanical phenomena, such as superposition and/or entanglement. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1).

The quantum computing device 12 and the quantum computing device 18 of FIG. 1 together implement a quantum file management system, components of which are distributed among one or more of the quantum computing device 12 and the quantum computing device 18. The quantum file management system includes quantum file managers 24 and 26, which operate to implement quantum files on the quantum computing device 12 and the quantum computing device 18, respectively. The quantum file management system also includes a quantum file registry 28 that includes metadata regarding each quantum file implemented in the quantum computing system 10, as discussed in greater detail below.

In the example of FIG. 1, the quantum computing system 10 implements a quantum file 30 (i.e., a "source quantum file 30") that is made up of two (2) qubits: a qubit 32 that is hosted on the quantum computing device 12, and a qubit 34 hosted on the quantum computing device 18. For purposes of this example, the source quantum file 30 is "owned" by the quantum computing device 12. However, it is to be understood that ownership of the source quantum file 30 may be migrated or transitioned from one quantum computing device to another. It is to be further understood that the source quantum file 30 in some examples may comprise more qubits than illustrated in FIG. 1.

The quantum computing system 10 also maintains a qubit pool 36 that represents qubits that are not presently allocated to any quantum files in the quantum computing system 10. As seen in FIG. 1, the qubit pool 36 includes unallocated qubits 38 and 40 hosted on the quantum computing device 12, and unallocated qubits 42 and 44 hosted on the quantum computing device 18. The quantum computing devices 12 and 18 of the quantum computing system 10 maintain a plurality of qubit identifiers (not shown) corresponding to each qubit 38, 40, 42, and 44 in the qubit pool 36, and further maintains metadata (not shown) comprising information that indicates a location of each qubit 38, 40, 42, and 44 in the qubit pool 36, as well as whether each qubit 38, 40, 42, and 44 in the qubit pool 36 is available to be allocated.

The quantum computing device 12 includes a file system 46 that includes one or more quantum file references 48(0)-48(R). Each of the quantum file references 48(0)-48(R) corresponds to a quantum file that is maintained in the quantum file registry 28 and that is "owned" by the quantum computing device 12. Thus, for example, the quantum file reference 48(0) may correspond to the source quantum file 30. Likewise, the quantum computing device 18 includes a file system 50 that includes one or more quantum file references 52(0)-52(F). It is to be understood that the file system 50 provides functionality corresponding to the functionality of the file system 46 described herein.

In exemplary operation, a quantum file such as the source quantum file 30 may be accessed by a requestor (e.g., a quantum application 54) via the quantum file reference 48(0), which is identified by the quantum application 54 via an identifier (not shown). The quantum application 54 provides the identifier to the quantum file manager 24 via any suitable inter-process communications mechanism, such as an application programming interface (API) or the like. In some examples, the quantum file manager 24 may be an integral part of a quantum operating system, and the appropriate intercommunication mechanisms between the quantum application 54 and the quantum file manager 24 may be generated in response to certain programming instructions, such as reading, writing, or otherwise accessing the quantum file 30 while the quantum application 54 is being compiled.

The quantum file manager 24 then accesses the file system 46. Based on the quantum file identifier provided by the quantum application 54, the quantum file manager 24 accesses the quantum file reference 48(0). The quantum file reference 48(0) includes information about the source quantum file 30 such as an internal quantum file identifier for the source quantum file 30, a location of a Quantum Assembly Language (QASM) file that contains programming instructions that access the source quantum file 30, and/or metadata for the source quantum file 30 (e.g., a creation timestamp of the source quantum file 30, a last modification timestamp of the source quantum file 30, and/or a current user of the source quantum file 30, as non-limiting examples). The quantum file reference 48(0) may also identify each qubit that makes up the source quantum file 30 (i.e., the qubits 32 and 34, in this example).

In some examples, data may be spread over the qubits 32 and 34 of the source quantum file 30 in a manner that dictates that the qubits 32 and 34 must be accessed in some sequential order for the data to have contextual meaning. Accordingly, some examples may provide that the order in which the qubits 32 and 34 are identified in the quantum file reference 48(0) may correspond to the appropriate order in which the qubits 32 and 34 should be accessed. In other examples, the quantum file reference 48(0) may have one or more additional fields identifying the appropriate order. Some examples may also provide that the quantum file reference 48(0) includes qubit entanglement status fields that indicate entanglement status information about the qubits 32 and 34 and/or superposition status fields that indicate superposition status information about the qubits 32 and 34.

In the example of FIG. 1, the quantum file manager 24, upon receiving an access request to a quantum file such as the source quantum file 30, may access the quantum file registry 28 (using, e.g., a linking service (not shown)) to determine a current status of the source quantum file 30. The quantum file registry 28 of FIG. 1 comprises a plurality of quantum file registry records 56, 58, and 60, each of which corresponds to a quantum file implemented in the quantum computing system 10. In this example, the quantum file registry record 56 (i.e., the "source quantum file registry record 56") corresponds to the source quantum file 30.

Each of the quantum file registry records 56, 58, and 60 includes current metadata regarding the corresponding quantum files. The metadata may include, as non-limiting examples, an internal file identifier of the corresponding quantum file, an indicator of a number of qubits that make up the corresponding quantum file, and, for each qubit of the number of qubits, a qubit identification field, an entanglement status field, and/or a superposition status field. The quantum file registry records 56, 58, and 60 each may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like.

The quantum file manager 24 updates the quantum file reference 48(0) with the information from the quantum file registry record 56 and the outcome of any checks, and also updates the timestamp field (if any) with the current time. The quantum file manager 24 then returns control to the quantum application 54, passing the quantum application 54 at least some of the updated information contained in the quantum file reference 48(0). The quantum application 54 may then initiate actions against the qubits 32 and 34, such as read actions, write actions, or the like.

One function provided by the quantum file managers 24 and 26 of FIG. 1 is the copying of quantum files. Accordingly, in the example of FIG. 1, the quantum file manager 24 may receive a request 62 from a requestor, such as the quantum application 54, to copy a first quantum file (e.g., the source quantum file 30) comprising a plurality of source qubits (e.g., the qubits 32 and 34) into a target quantum file (not shown) comprising a plurality of target qubits (such as the qubits 38 and 42 from the qubit pool 36). The quantum file manager 24 accesses the source quantum file registry record 56 corresponding to the source quantum file 30 to ascertain the identity and locations of each of the source qubits 32 and 34.

In some examples, before continuing with the quantum file copy operation, one or more checks may be performed by the quantum file manager 24. For example, the quantum file manager 24 may first check that the target qubits 38 and 42 are available for allocation from the qubit pool 36 (e.g., based on the qubit identifiers and associated metadata maintained for each qubit 38, 40, 42, and 44 in the qubit pool 36), and may abort the copy operation if there is an insufficient number of available qubits in the qubit pool 36. Some examples may provide that the quantum file manager 24 also obtains exclusive access to the plurality of source qubits 32 and 34 and the plurality of target qubits 38 and 42 before attempting the quantum file copy operation. Obtaining exclusive access may comprise, as non-limiting examples, operations for ensuring that no other processes are operating on the qubits 32, 34, 38, and 42, and/or operations for indicating that access to the qubits 32, 34, 38, and 42 is locked to other processes while the quantum file copy operation is underway. The quantum file manager 24 in some examples may further ensure that the plurality of source qubits 32 and 34 are not entangled (i.e., are in an entanglement state of "not entangled") and/or are not in a state of superposition prior to performing the quantum file copy operation.

The quantum file manager 24 then allocates the target qubits 38 and 42 for the quantum file copy operation. Operations for allocating the target qubits 38 and 42 may comprise, for instance, updating metadata for the qubit pool 36 to indicate that the target qubits 38 and 42 are no longer available to be allocated. In some examples, operations for allocating the target qubits 38 and 40 may include the quantum file manager 24 specifically requesting allocation of target qubits from a specified quantum computing device, such as the quantum computing device 18. This functionality may be desirable in scenarios in which, e.g., the quantum computing device 12 hosting the source quantum file 30 is experiencing operational difficulties or is subject to planned downtime.

The quantum file manager 24 next copies data stored by each of the source qubits 32 and 34 into the respective target qubits 38 and 42, and generates a target quantum file registry record (such as, e.g., the quantum file registry record 58) corresponding to the target quantum file. The target quantum file registry record 58 identifies the target qubits 38 and 42 and a location of each of the target qubits 38 and 42. In examples in which the target quantum file is an existing target quantum file, the operation for generating the target quantum file registry record 58 may include updating the contents of the target quantum file registry record 58 with new information identifying the target qubits 34 and 42 and the locations thereof.

Figure 2:
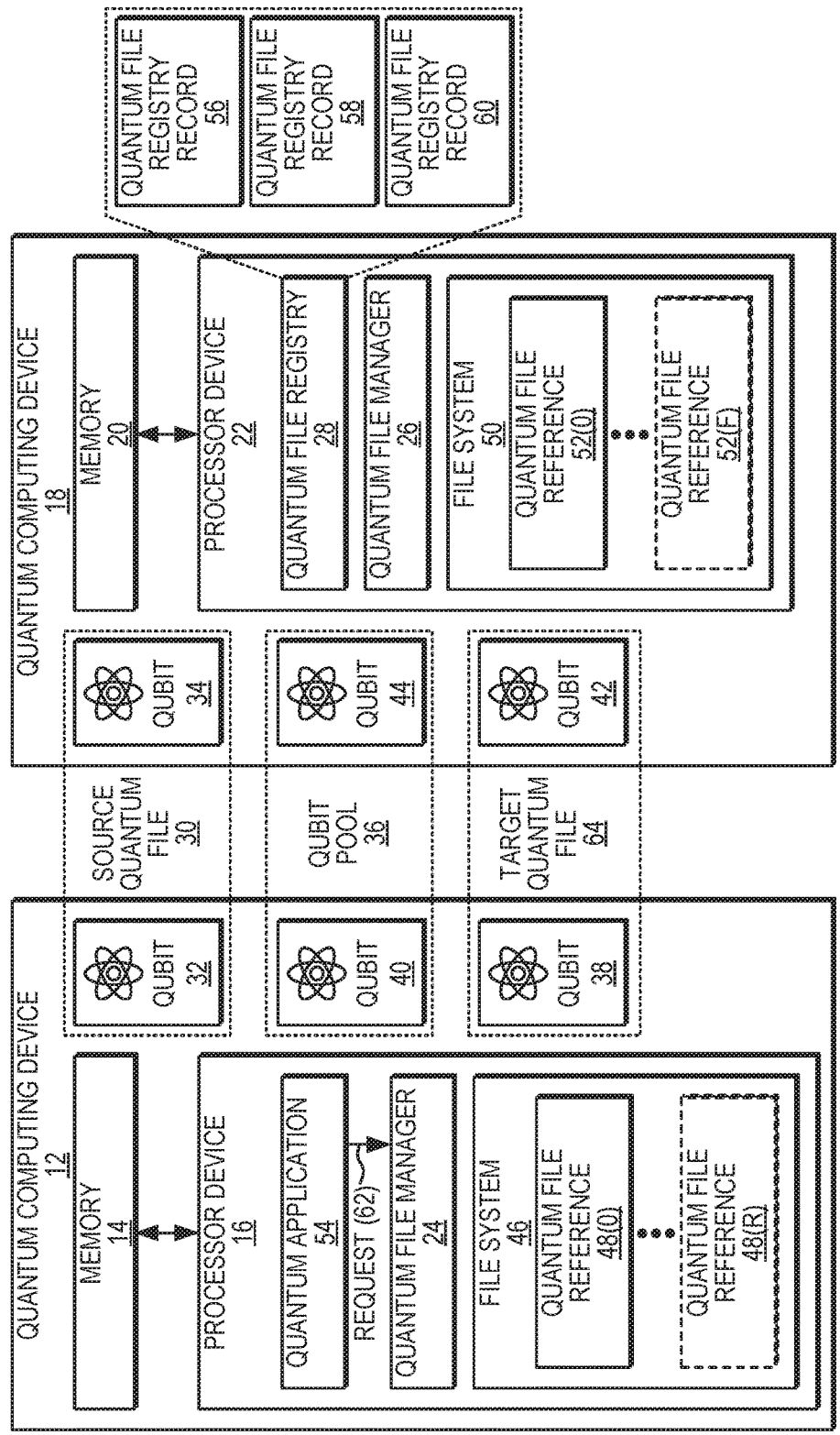
FIG. 2 is a block diagram of the quantum computing system of FIG. 1, showing the result of performing a quantum file copy operation according to one example.

The results of the quantum file operation described above are illustrated in FIG. 2. As seen in FIG. 2, the data stored by the source qubits 32 and 34 have been copied into target qubits 38 and 42, which together constitute a target quantum file 64. The qubit pool 36 now contains only the unallocated qubits 40 and 44.

In some examples, the quantum file manager 24 may verify the sequence of the plurality of target qubits 38 and 42 using a quantum file specification (such as, e.g., a QASF file, as a non-limiting example) that corresponds to the source quantum file 30. For instance, as noted above, the quantum file reference 48(0) corresponding to the source quantum file 30 may identify a location of a QASM file that contains programming instructions that access the source quantum file 30. The quantum file manager 24 thus may use the QASM file referenced by the quantum file reference 48(0) to verify that the target qubits 38 and 42 of the target quantum file 64 are in the same sequence as the source qubits 32 and 34 of the source quantum file 30.

Some examples may provide that the quantum file manager 24 may perform the quantum file copy operation as part of a quantum file move operation. Accordingly, in such examples, after the quantum file copy operation is complete, the quantum file manager 24 may delete the source quantum file 30 by deleting the corresponding source quantum file registry record 56 and deallocating the plurality of source qubits 32 and 34. The quantum file manager 24 may then update the target quantum file registry record 58 to have a same quantum file identifier as the source quantum file registry record 56.

Figure 3A:
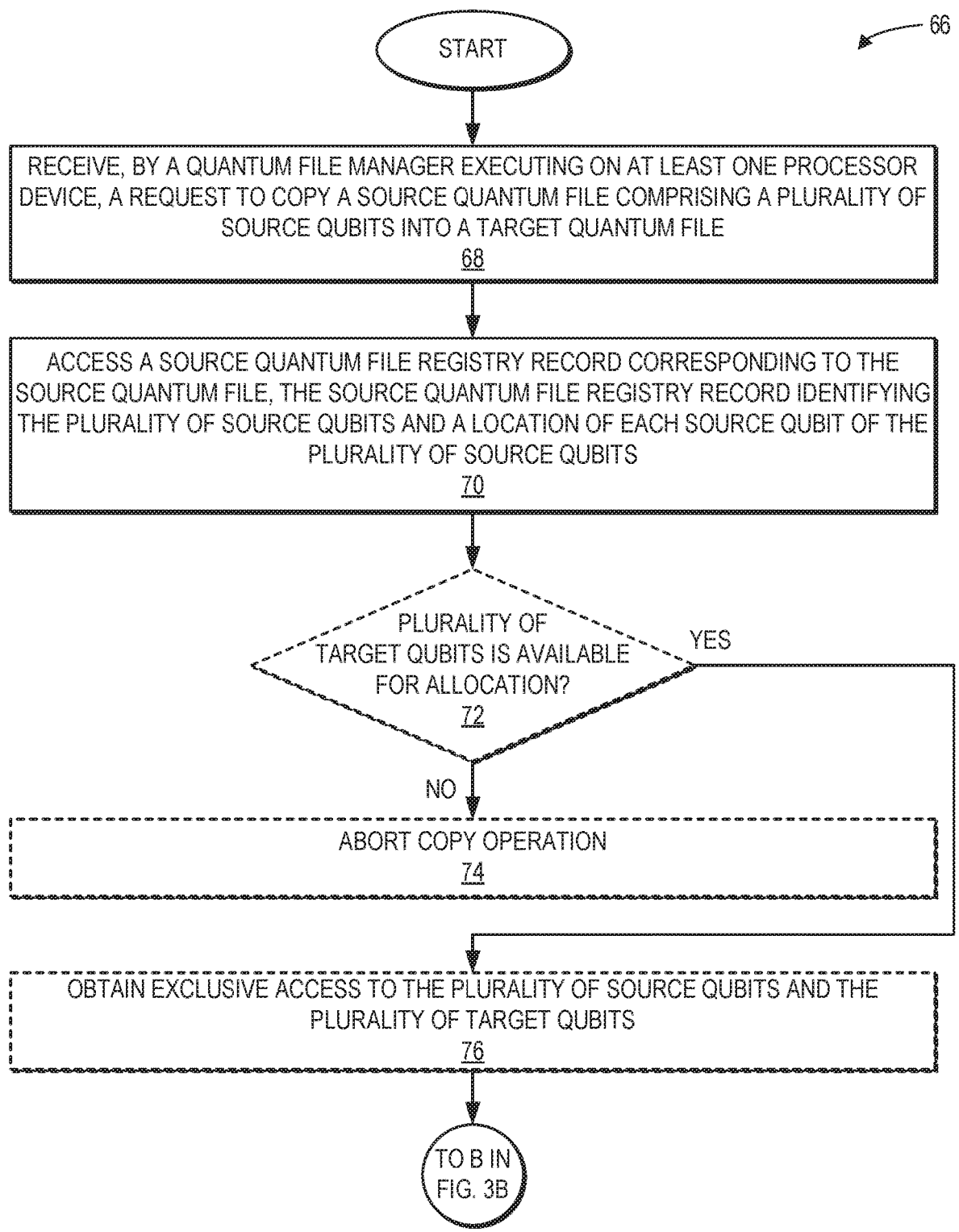
FIGS. 3A-3C are flowcharts illustrating operations for performing quantum file copying, according to one example.
Figure 3B:
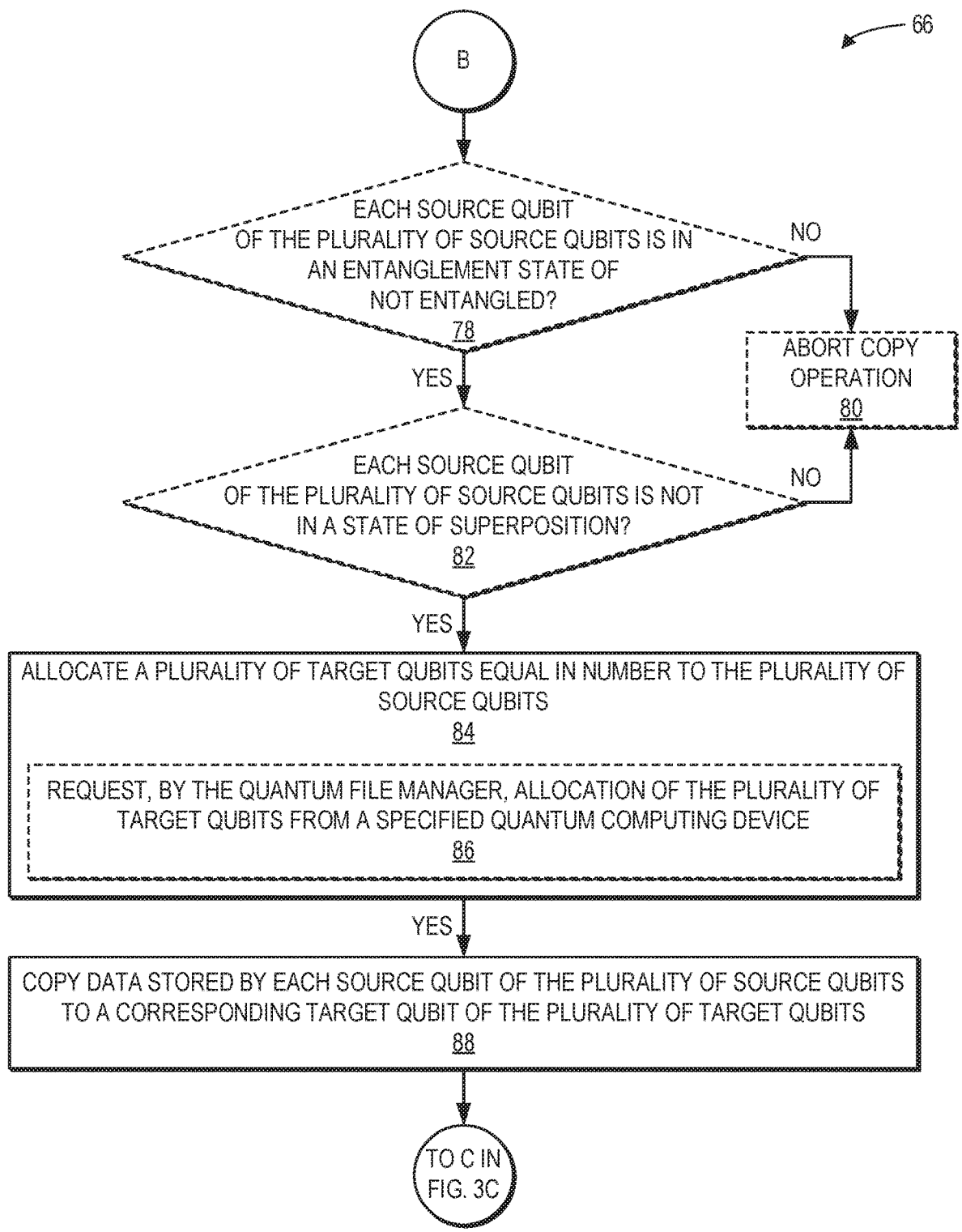
Figure 3C:
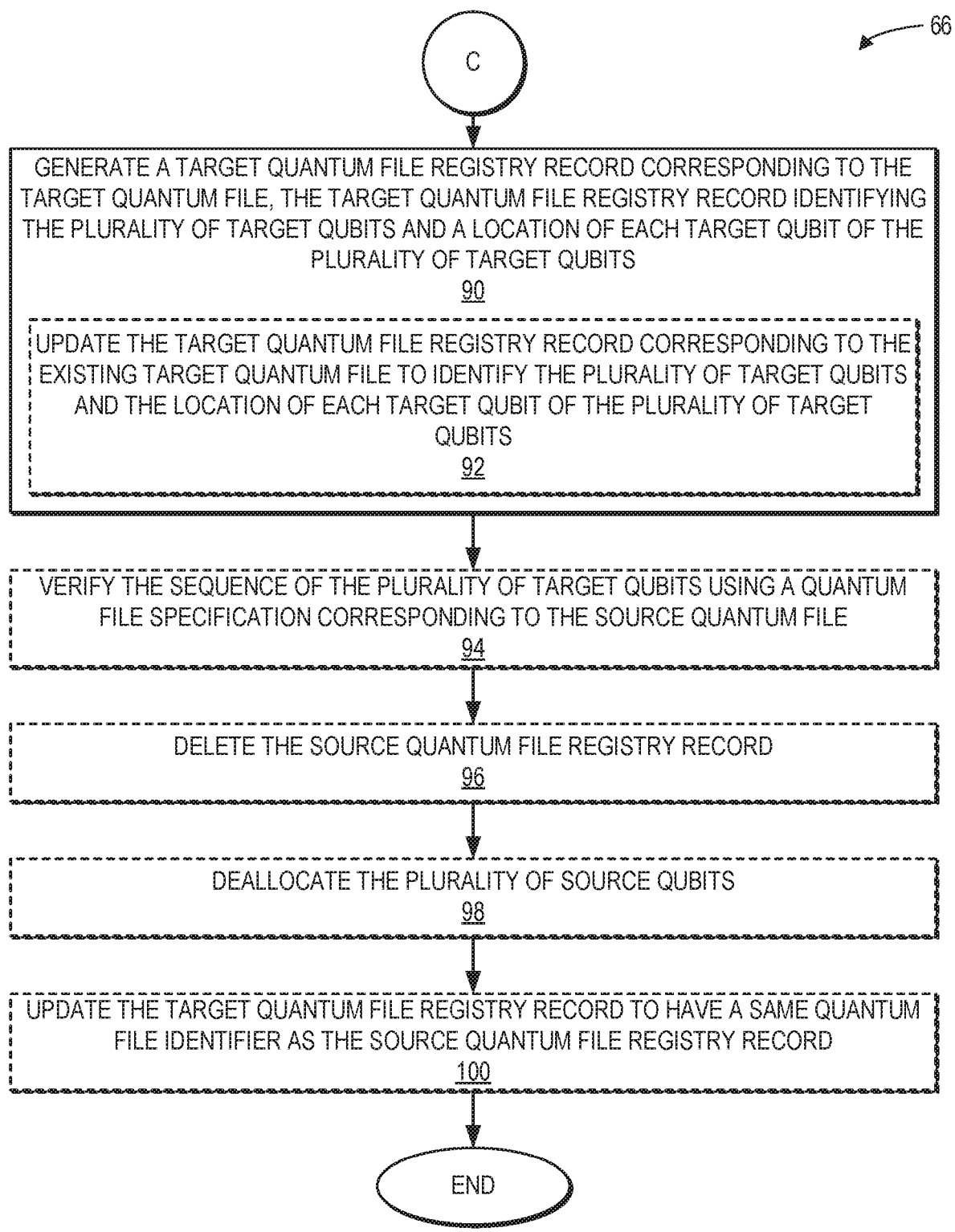

To illustrate operations for performing quantum file copying according to one example, FIGS. 3A-3C provide a flowchart 66. Elements of FIGS. 1 and 2 are referenced in describing FIGS. 3A-3C for the sake of clarity. In FIG. 3A, operations begin with the quantum file manager 24, executing on the at least one processor device 16, receiving (e.g., from a requestor such as the quantum application 54) the request 62 to copy the source quantum file 30 comprising the plurality of source qubits 32 and 34 into the target quantum file 64 (block 68). The quantum file manager next accesses the source quantum file registry record 56 corresponding to the source quantum file 30, the source quantum file registry record 56 identifying the plurality of source qubits 32 and 34 and a location of each source qubit of the plurality of source qubits 32 and 34 (block 70).

In some examples, the quantum file manager 24 may determine whether a plurality of target qubits, such as the qubits 38 and 42 of FIG. 1, is available for allocation (block 72). If not, the quantum file manager 24 aborts the copy operation (block 74). However, if the quantum file manager 24 determines at decision block 72 that the plurality of target qubits 38 and 42 is available for allocation, the quantum file manager 24 in some examples may next obtain exclusive access to the plurality of source qubits 32 and 34 and the plurality of target qubits 38 and 42 (block 76). Operations then continue at block 78 of FIG. 3B.

Referring now to FIG. 3B, some examples may provide that the quantum file manager 24 determines whether each source qubit of the plurality of source qubits 32 and 34 is in an entanglement state of not entangled (block 78). If not (i.e., if one or more of the source qubits 32 and 34 are in an entangled state), the quantum file manager 24 aborts the copy operation (block 80). If the plurality of source qubits 32 and 34 are determined to be in an entanglement state of not entangled at decision block 78, the quantum file manager 24 according to some examples may next determine whether each source qubit of the plurality of source qubits 32 and 34 is not in a state of superposition (block 82). If any of the source qubits 32 and 34 are in a state of superposition, the quantum file manager 24 aborts the copy operation (block 80). However, if the quantum file manager 24 determines at decision block 82 that each source qubit of the plurality of source qubits 32 and 34 is not in a state of superposition, the quantum file manager 24 allocates the plurality of target qubits 38 and 42 equal in number to the plurality of source qubits 32 and 34 (block 84). In some examples, the operations of block 84 for allocating the plurality of target qubits 38 and 42 comprise requesting, by the quantum file manager 24, allocation of the plurality of target qubits 38 and 42 from a specified quantum computing device (block 86).

The quantum file manager 24 then copies data stored by each source qubit of the plurality of source qubits 32 and 34 to a corresponding target qubit of the plurality of target qubits 38 and 42 (block 88). Operations then continue at block 90 of FIG. 3C.

Turning now to FIG. 3C, the quantum file manager 24 generates a target quantum file registry record (such as the target quantum file registry record 58) corresponding to the target quantum file 64, the target quantum file registry record 58 identifying the plurality of target qubits 38 and 42 and a location of each target qubit of the plurality of target qubits 38 and 42 (block 90). According to some examples in which the target quantum file 64 is an existing quantum file, the operations of block 90 for generating the target quantum file registry record 58 may comprise updating the target quantum file registry record 58 corresponding to the existing target quantum file 64 to identify the plurality of target qubits 38 and 42 and the location of each target qubit of the plurality of target qubits 38 and 42 (block 92).

In some examples, the quantum file manager 24 may also verify the sequence of the plurality of target qubits 38 and 42 using a quantum file specification (e.g., a QASM file) corresponding to the source quantum file 30 (block 94). Some examples of the quantum file manager 24 may further perform a quantum move operation by deleting the source quantum file registry record 56 (block 96). The quantum file manager 24 in such examples also deallocates the plurality of source qubits 32 and 34 (block 98). Finally, the quantum file manager 24 updates the target quantum file registry record 58 to have a same quantum file identifier as the source quantum file registry record 56 (block 100).

Figure 4:
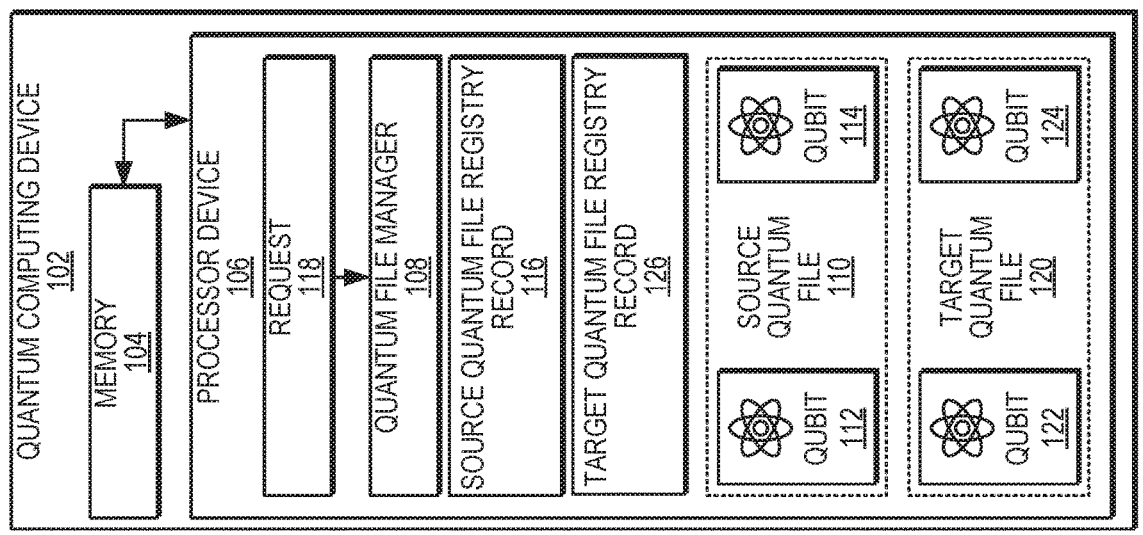
FIG. 4 is a simpler block diagram of the quantum computing system of FIG. 1 for performing quantum file copying, according to one example.

FIG. 4 provides a simpler block diagram of a quantum computing device 102 according to one example. The quantum computing device 102 comprises a system memory 104 and a processor device 106. The processor device 106 provides a quantum file manager 108, which operates to implement quantum files on the quantum computing device 102. In the example of FIG. 4, the quantum computing device 102 implements a quantum file 110 (i.e., a "source quantum file 110") that is made up of a plurality of source qubits 112 and 114. The processor device 106 also provides a source quantum file registry record 116 that corresponds to the source quantum file 110, and that provides current metadata regarding the source quantum file 110.

Upon receiving a request 118 to copy the source quantum file 110 into a target quantum file 120, the quantum file manager 108 accesses the source quantum file registry record 116 corresponding to the source quantum file 110 to ascertain the identity and locations of each of the source qubits 112 and 114. The quantum file manager 108 then allocates target qubits 122 and 124 for the quantum file copy operation. The quantum file manager 108 copies data stored by each of the source qubits 112 and 114 into the respective target qubits 122 and 124, and generates a target quantum file registry record 126 corresponding to the target quantum file 120. The target quantum file registry record 126 generated by the quantum file manager 108 identifies the target qubits 122 and 124 and a location of each of the target qubits 122 and 124.

Figure 5:
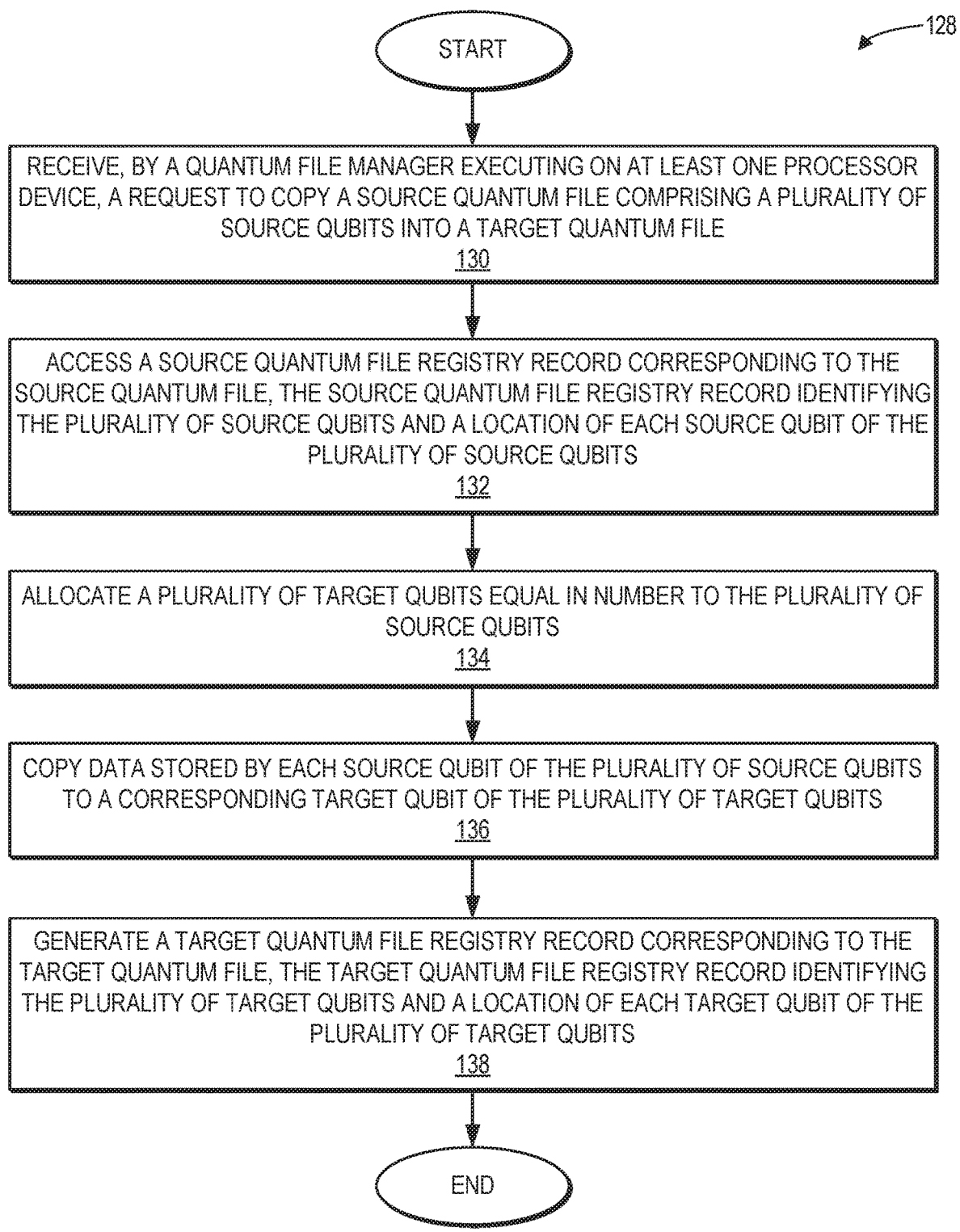
FIG. 5 is a flowchart of a simplified method for performing quantum file copying in the quantum computing system of FIG. 4, according to one example.

To illustrate a simplified method for performing quantum file copying in the quantum computing device 102 of FIG. 4 according to one example, FIG. 5 provides a flowchart 128. For the sake of clarity, elements of FIG. 4 are referenced in describing FIG. 5. Operations in FIG. 5 begin with the quantum file manager 108, executing on the at least one processor device 106, receiving the request 118 to copy the source quantum file 110 comprising the plurality of source qubits 112 and 114 into the target quantum file 120 (block 130). The quantum file manager 108 accesses the source quantum file registry record 116 corresponding to the source quantum file 110, the source quantum file registry record 116 identifying the plurality of source qubits 112 and 114 and a location of each source qubit of the plurality of source qubits 112 and 114 (block 132).

The quantum file manager 108 next allocates the plurality of target qubits 122 and 124 equal in number to the plurality of source qubits 112 and 114 (block 134). The quantum file manager 108 then copies data stored by each source qubit of the plurality of source qubits 112 and 114 to a corresponding target qubit of the plurality of target qubits 122 and 124 (block 136). Finally, the quantum file manager 108 generates the target quantum file registry record 126 corresponding to the target quantum file 120, the target quantum file registry record 126 identifying the plurality of target qubits 122 and 124 and a location of each target qubit of the plurality of target qubits 122 and 124 (block 138).

Figure 6:
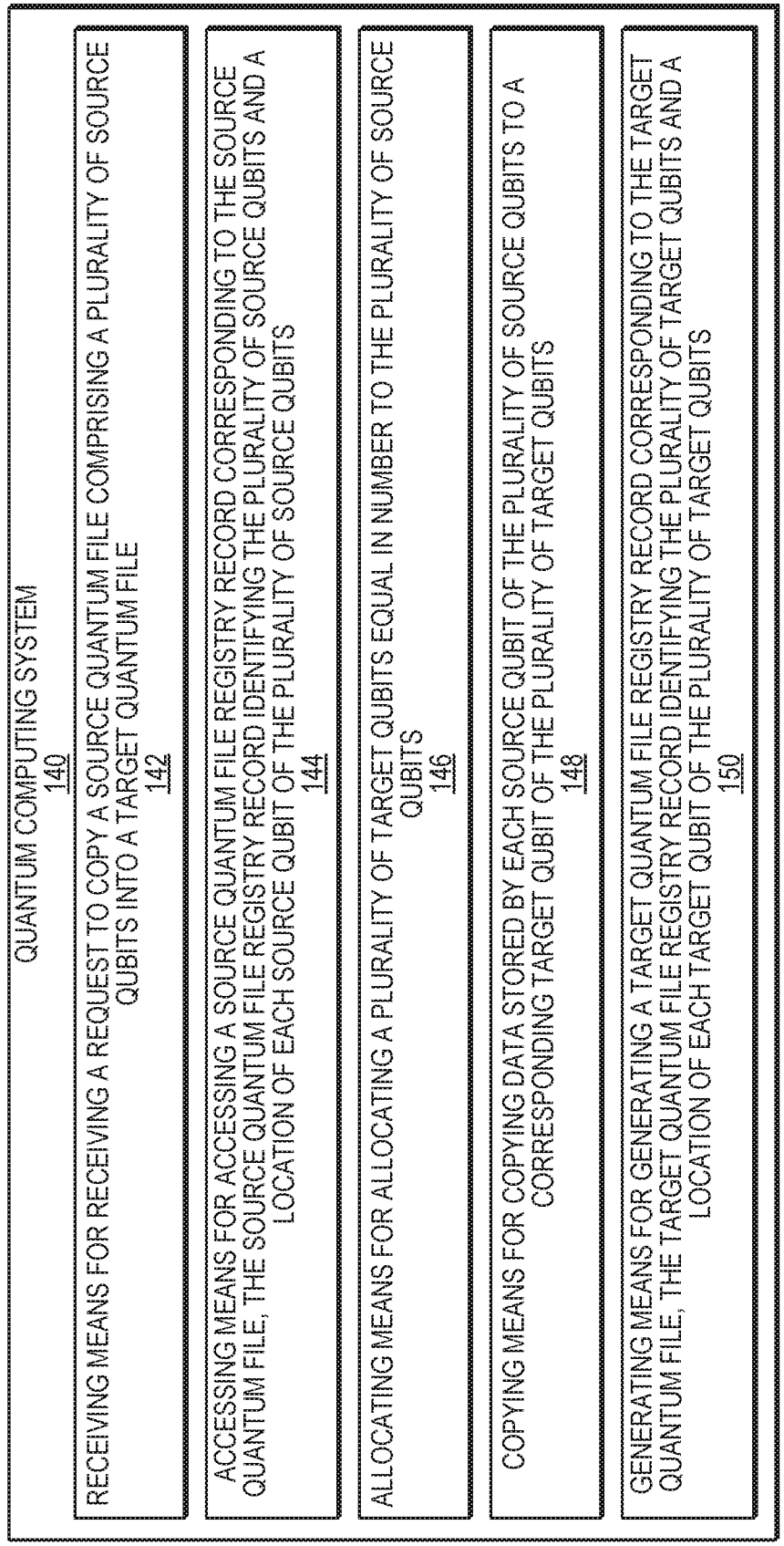
FIG. 6 is a block diagram of a quantum computing system suitable for implementing examples according to one example.

FIG. 6 provides a block diagram of a quantum computing system 140 suitable for implementing examples according to one example. In this example, the quantum computing system 140 includes receiving means 142 for receiving a request to copy a source quantum file comprising a plurality of source qubits into a target quantum file. The quantum computing system 140 further includes accessing means 144 for accessing a source quantum file registry record corresponding to the source quantum file, the source quantum file registry record identifying the plurality of source qubits and a location of each source qubit of the plurality of source qubits. The quantum computing system 140 also includes allocating means 146 for allocating a plurality of target qubits equal in number to the plurality of source qubits. The quantum computing system 140 additionally includes copying means 148 for copying data stored by each source qubit of the plurality of source qubits to a corresponding target qubit of the plurality of target qubits. The quantum computing system 140 further includes generating means 150 for generating a target quantum file registry record corresponding to the target quantum file, the target quantum file registry record identifying the plurality of target qubits and a location of each target qubit of the plurality of target qubits.

Figure 7A:
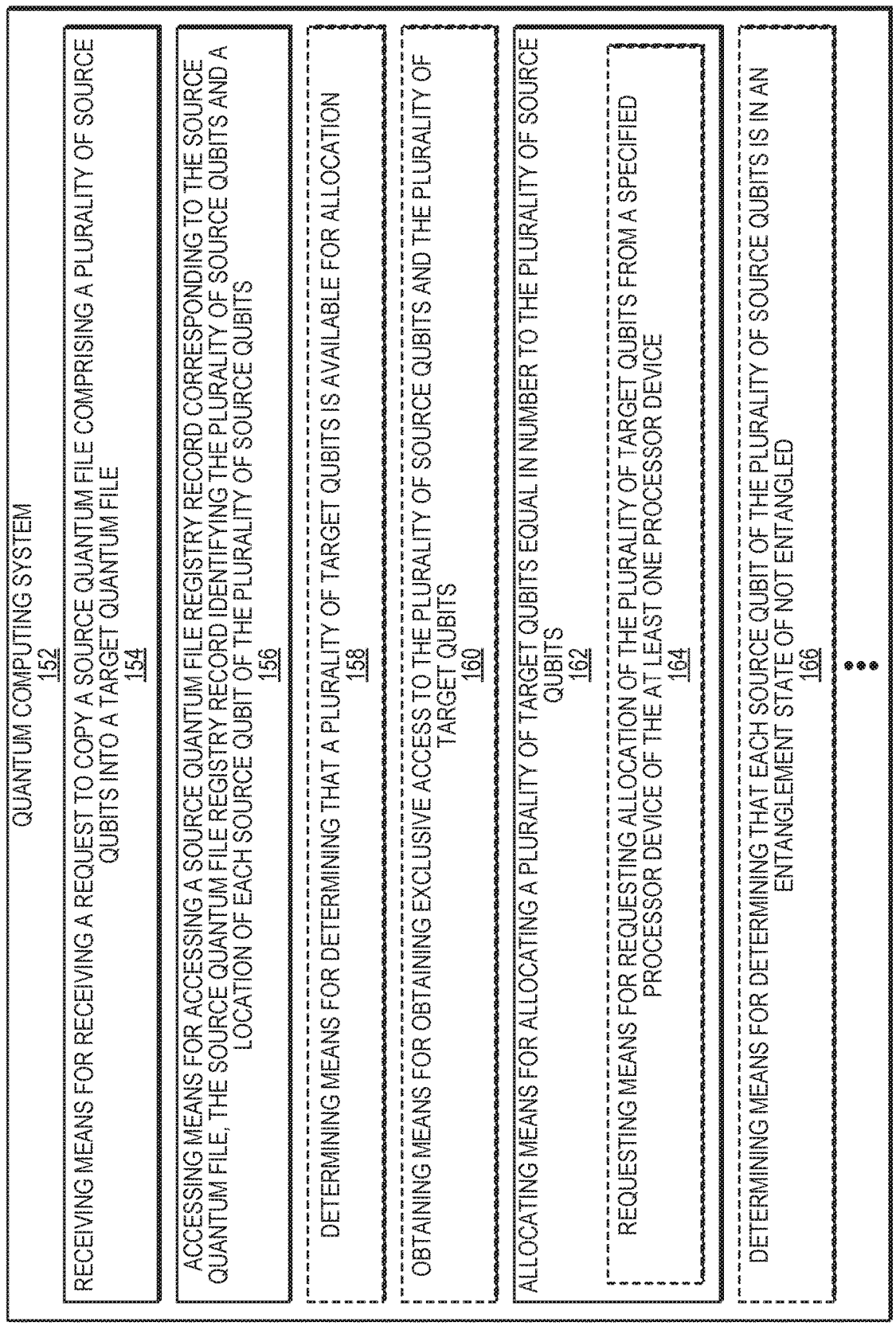
FIGS. 7A-7C are block diagrams of a quantum computer system suitable for implementing examples according to another example.
Figure 7B:
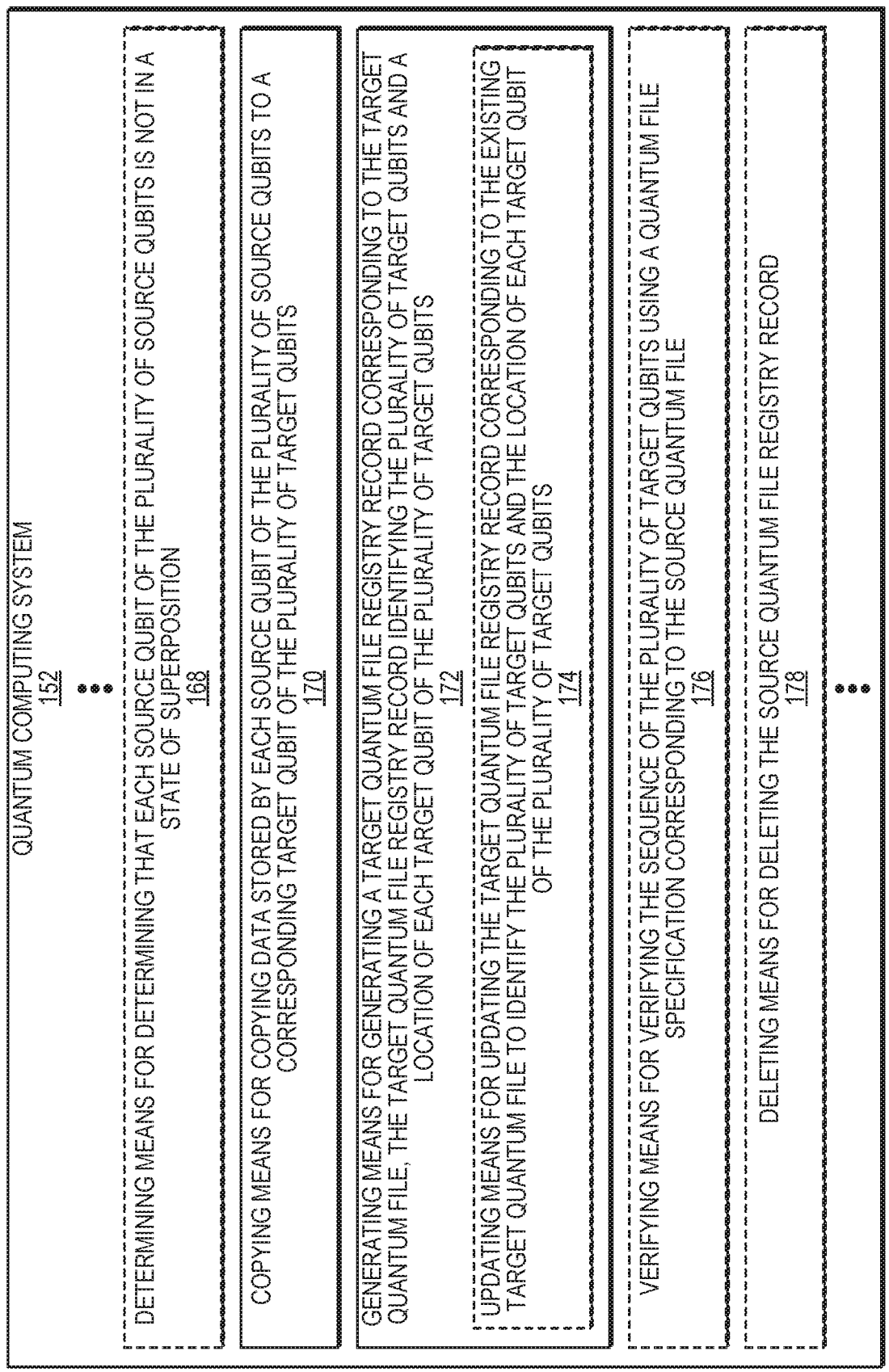
Figure 7C:
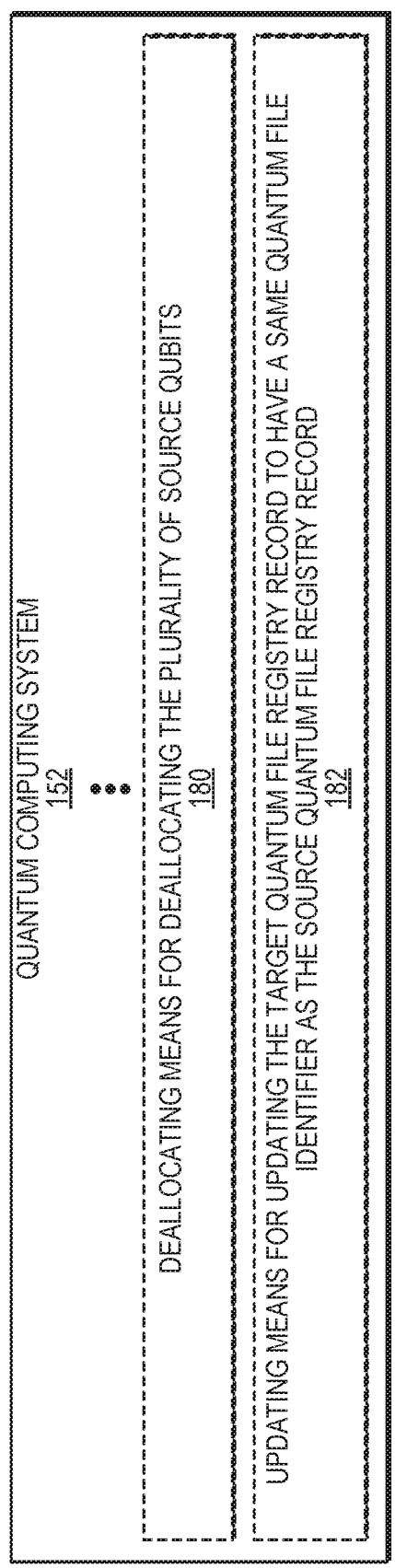

FIGS. 7A-7C are more detailed block diagrams of a quantum computing system 152 suitable for implementing examples according to another example. Referring to FIG. 7A, the quantum computing system 152 in this example includes receiving means 154 for receiving a request to copy a source quantum file comprising a plurality of source qubits into a target quantum file. The quantum computing system 152 further includes accessing means 156 for accessing a source quantum file registry record corresponding to the source quantum file, the source quantum file registry record identifying the plurality of source qubits and a location of each source qubit of the plurality of source qubits. The quantum computing system 152 according to some examples also includes determining means 158 for determining that a plurality of target qubits is available for allocation. The quantum computing system 152 in some examples additionally includes obtaining means 160 for obtaining exclusive access to the plurality of source qubits and the plurality of target qubits.

The quantum computing system 152 further includes allocating means 162 for allocating a plurality of target qubits equal in number to the plurality of source qubits. In some examples, the allocating means 162 comprises requesting means 164 for requesting allocation of the plurality of target qubits from a specified quantum computing device. Some examples may provide that the quantum computing system 152 also includes determining means 166 for determining that each source qubit of the plurality of source qubits is in an entanglement state of not entangled.

With continuing reference to FIG. 7B, the quantum computing system 152 in some examples additionally includes determining means 168 for determining that each source qubit of the plurality of source qubits is not in a state of superposition. The quantum computing system 152 further includes copying means 170 for copying data stored by each source qubit of the plurality of source qubits to a corresponding target qubit of the plurality of target qubits. The quantum computing system 152 also includes generating means 172 for generating a target quantum file registry record corresponding to the target quantum file, the target quantum file registry record identifying the plurality of target qubits and a location of each target qubit of the plurality of target qubits. Some examples may provide that the generating means 172 may comprise updating means 174 for updating the target quantum file registry record corresponding to the existing target quantum file to identify the plurality of target qubits and the location of each target qubit of the plurality of target qubits.

The quantum computing system 152 in some examples additionally includes verifying means 176 for verifying the sequence of the plurality of target qubits using a quantum file specification corresponding to the source quantum file. Some examples may provide that the quantum computing system 152 further includes deleting means 178 for deleting the source quantum file registry record.

Referring now to FIG. 7C, the quantum computing system 152 according to some examples may further include deallocating means 180 for deallocating the plurality of source qubits. The quantum computing system 152 in some examples also includes updating means 182 for updating the target quantum file registry record to have a same quantum file identifier as the source quantum file registry record.

Figure 8:
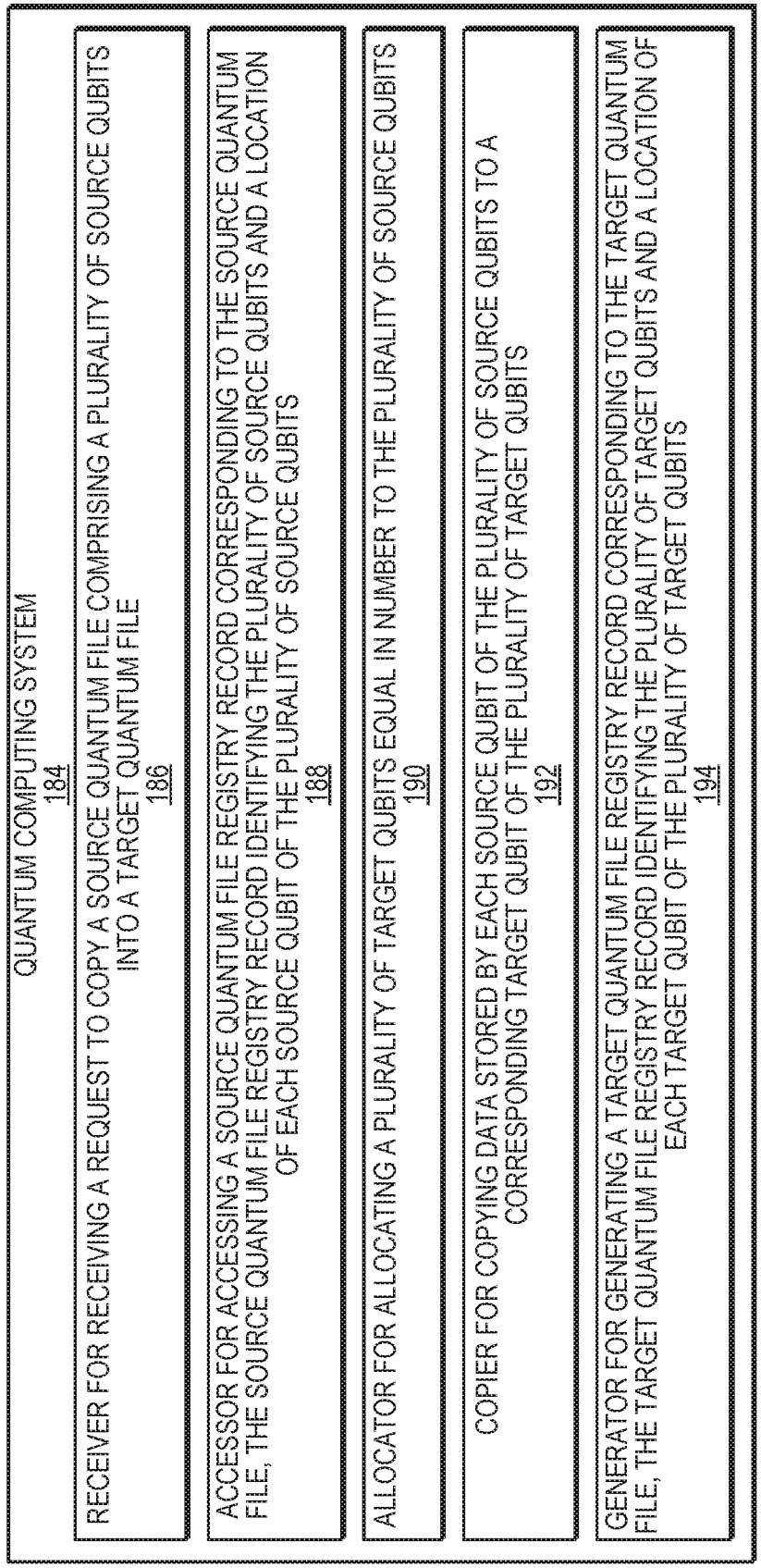
FIG. 8 is a block diagram of a quantum computing system suitable for implementing examples according to yet another example.

FIG. 8 provides a block diagram of a quantum computing system 184 suitable for implementing examples according to yet another example. In this example, the quantum computing system 184 includes a receiver 186 for receiving a request to copy a source quantum file comprising a plurality of source qubits into a target quantum file. The quantum computing system 184 further includes an accessor 188 for accessing a source quantum file registry record corresponding to the source quantum file, the source quantum file registry record identifying the plurality of source qubits and a location of each source qubit of the plurality of source qubits. The quantum computing system 184 also includes an allocator 190 for allocating a plurality of target qubits equal in number to the plurality of source qubits. The quantum computing system 184 additionally includes a copier 192 for copying data stored by each source qubit of the plurality of source qubits to a corresponding target qubit of the plurality of target qubits.

The quantum computing system 184 further includes a generator 194 for generating a target quantum file registry record corresponding to the target quantum file, the target quantum file registry record identifying the plurality of target qubits and a location of each target qubit of the plurality of target qubits.

Figure 9A:
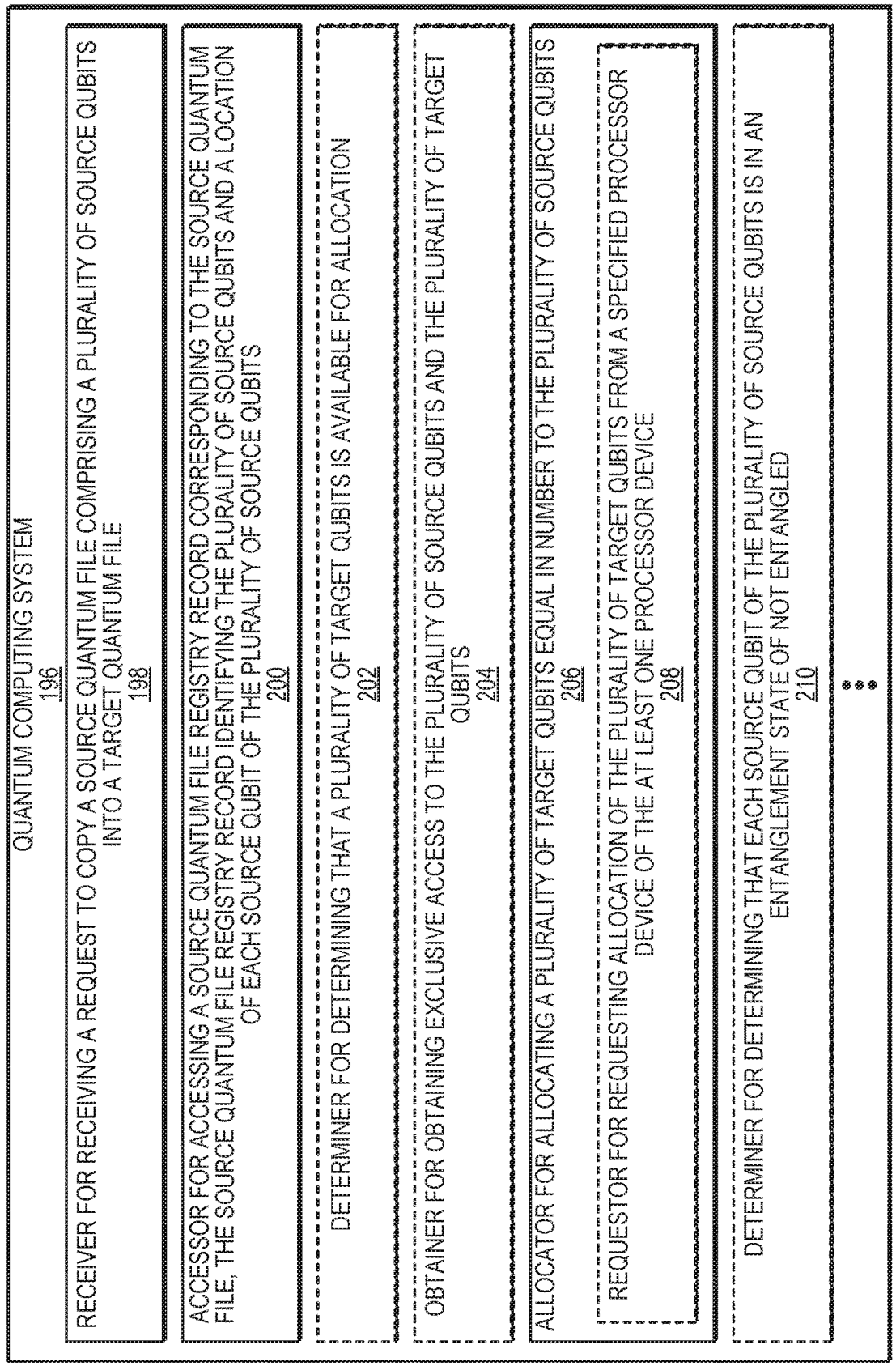
FIGS. 9A-9C are block diagrams of a quantum computing system suitable for implementing examples according to still another example.
Figure 9B:
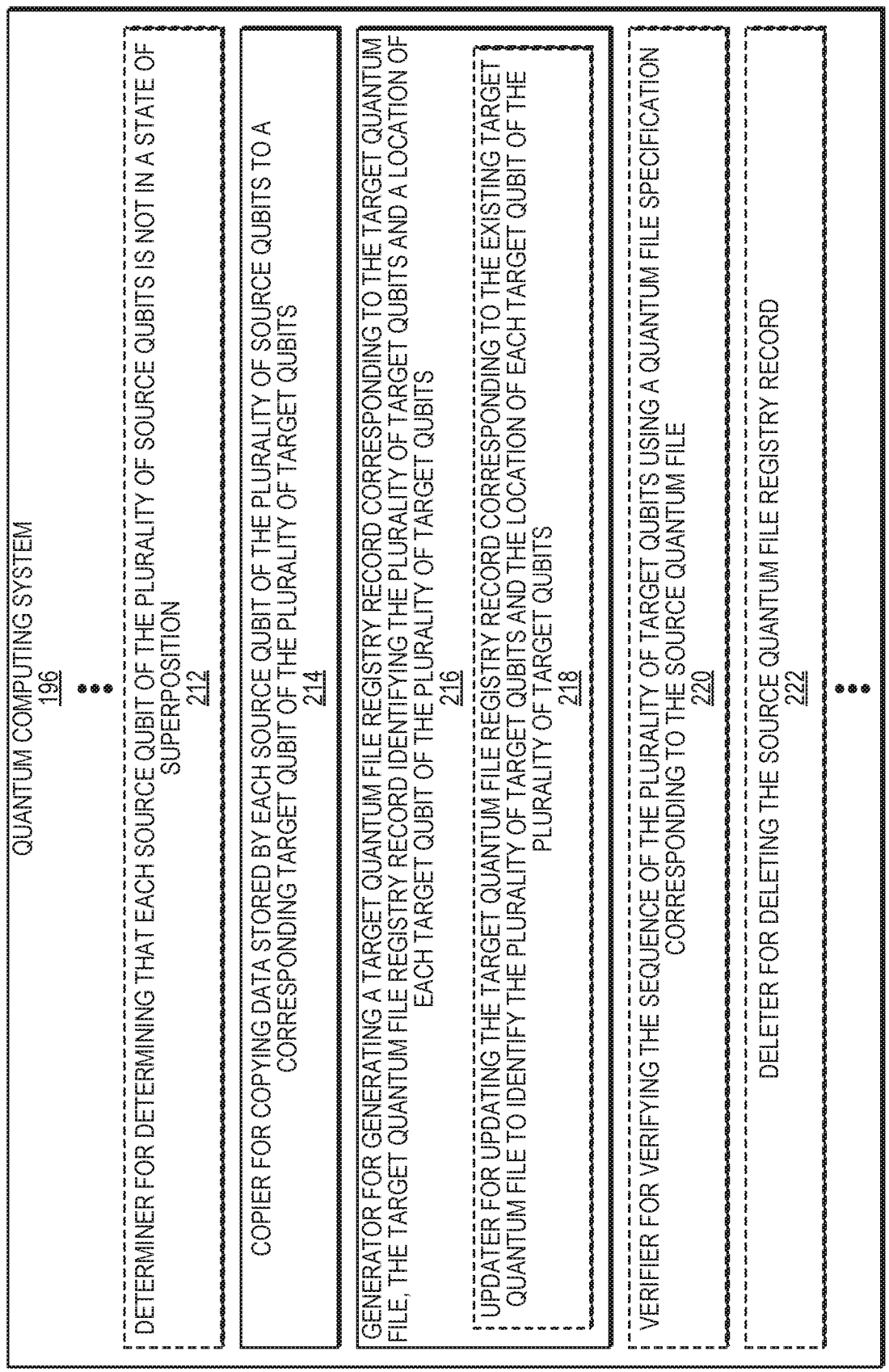
Figure 9C:
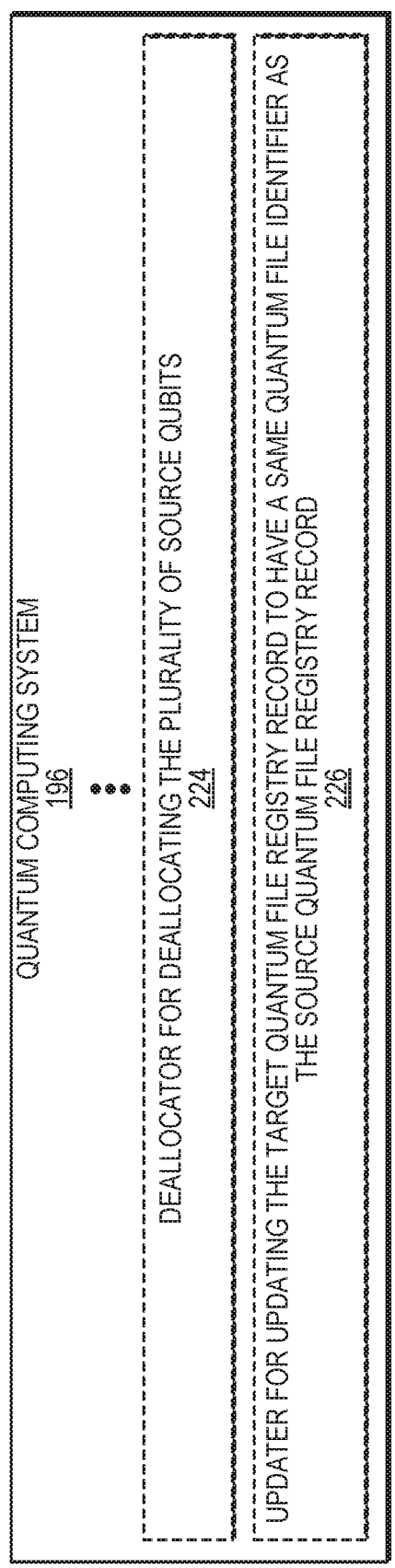

FIGS. 9A-9C provide a more detailed block diagram of a quantum computing system 196 suitable for implementing examples according to still another example. In FIG. 9A, the quantum computing system 196 includes a receiver 198 for receiving a request to copy a source quantum file comprising a plurality of source qubits into a target quantum file. The quantum computing system 196 further includes an accessor 200 for accessing a source quantum file registry record corresponding to the source quantum file, the source quantum file registry record identifying the plurality of source qubits and a location of each source qubit of the plurality of source qubits. In some examples, the quantum computing system 196 also includes a determiner 202 for determining that a plurality of target qubits is available for allocation. Some examples may provide that the quantum computing system 196 additionally includes an obtainer 204 for obtaining exclusive access to the plurality of source qubits and the plurality of target qubits.

The quantum computing system 196 further includes an allocator 206 for allocating a plurality of target qubits equal in number to the plurality of source qubits. According to some examples, the allocator 206 may include a requestor 208 for requesting allocation of the plurality of target qubits from a specified quantum computing device. Some examples may provide that the quantum computing system 196 also includes a determiner 210 for determining that each source qubit of the plurality of source qubits is in an entanglement state of not entangled.

Referring now to FIG. 9B, the quantum computing system 196 in some examples additionally includes a determiner 212 for determining that each source qubit of the plurality of source qubits is not in a state of superposition. The quantum computing system 196 further includes a copier 214 for copying data stored by each source qubit of the plurality of source qubits to a corresponding target qubit of the plurality of target qubits. The quantum computing system 196 also includes a generator 216 for generating a target quantum file registry record corresponding to the target quantum file, the target quantum file registry record identifying the plurality of target qubits and a location of each target qubit of the plurality of target qubits. In some examples, the generator 216 may include an updater 218 for updating the target quantum file registry record corresponding to the existing target quantum file to identify the plurality of target qubits and the location of each target qubit of the plurality of target qubits.

Some examples may provide that the quantum computing system 196 additionally includes a verifier 220 for verifying the sequence of the plurality of target qubits using a quantum file specification corresponding to the source quantum file. The quantum computing system 196 in some examples further includes a deleter 222 for deleting the source quantum file registry record.

Turning now to FIG. 9C, the quantum computing system 196 according to some examples also includes a deallocator 224 for deallocating the plurality of source qubits. The quantum computing system 196 in some examples additionally includes an updater 226 for updating the target quantum file registry record to have a same quantum file identifier as the source quantum file registry record.

Figure 10:
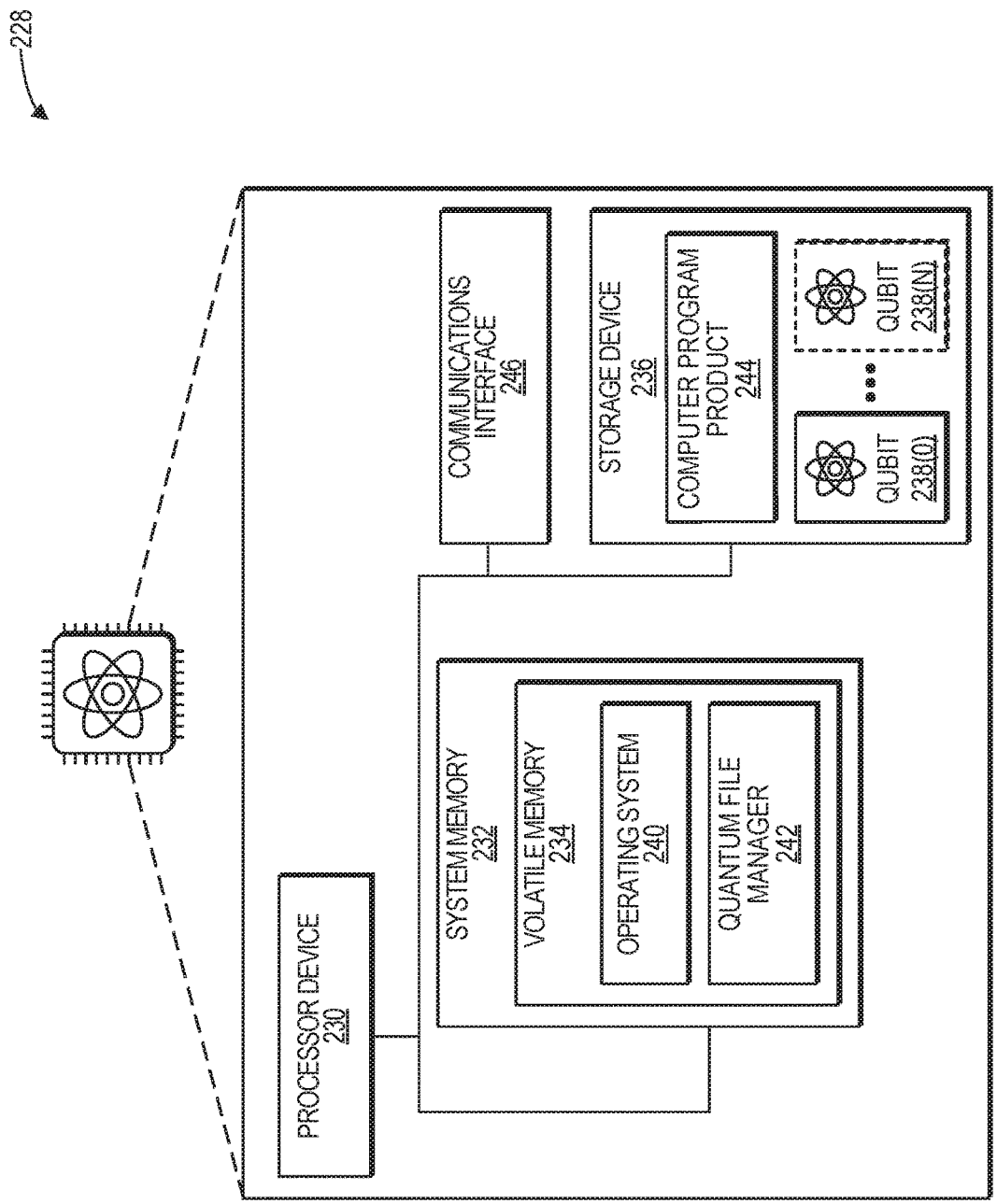
FIG. 10 is a block diagram of a quantum computing device suitable for implementing examples, according to one example.

FIG. 10 is a block diagram of a quantum computing device 228, such as the quantum computing device 12 and the quantum computing device 18 of FIG. 1, suitable for implementing examples according to one example. The quantum computing device 228 may comprise any suitable quantum computing device or devices. The quantum computing device 228 can operate using classical computing principles or quantum computing principles. When using quantum computing principles, the quantum computing device 228 performs computations that utilize quantum-mechanical phenomena, such as superposition and entanglement. The quantum computing device 228 may operate under certain environmental conditions, such as at or near zero degrees (0°) Kelvin. When using classical computing principles, the quantum computing device 228 utilizes binary digits that have a value of either zero (0) or one (1).

The quantum computing device 228 includes a processor device 230 and the system memory 232. The processor device 230 can be any commercially available or proprietary processor suitable for operating in a quantum environment. The system memory 232 may include volatile memory 234 (e.g., random-access memory (RAM)). The quantum computing device 228 may further include or be coupled to a non-transitory computer-readable storage medium such as a storage device 236, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 236 and other drives associated with computer-readable media and computer-usable media may provide non-volatile storage of data, data structures, computer-executable instructions, and the like. The storage device may also provide functionality for storing one or more qubits 238(0)-238(N).

A number of modules can be stored in the storage device 236 and in the volatile memory 234, including an operating system 240 and one or more modules, such as a quantum file manager 242. All or a portion of the examples may be implemented as a computer program product 244 stored on a transitory or non-transitory computer-usable or computer-readable storage medium, such as the storage device 236, which includes complex programming instructions, such as complex computer-readable program code, to cause the processor device 230 to carry out the steps described herein. Thus, the computer-readable program code can comprise software instructions for implementing the functionality of the examples described herein when executed on the processor device 230. An operator may also be able to enter one or more configuration commands through a keyboard (not illustrated), a pointing device such as a mouse (not illustrated), or a touch-sensitive surface such as a display device. The quantum computing device 228 may also include a communications interface 246 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a method that includes receiving, by a quantum file manager executing on at least one processor device, a request to copy a source quantum file including a plurality of source qubits into a target quantum file, accessing a source quantum file registry record corresponding to the source quantum file, the source quantum file registry record identifying the plurality of source qubits and a location of each source qubit of the plurality of source qubits, allocating a plurality of target qubits equal in number to the plurality of source qubits, copying data stored by each source qubit of the plurality of source qubits to a corresponding target qubit of the plurality of target qubits, and generating a target quantum file registry record corresponding to the target quantum file, the target quantum file registry record identifying the plurality of target qubits and a location of each target qubit of the plurality of target qubits.

Example 2 is the method of example 1, further including, prior to allocating the plurality of target qubits, determining that the plurality of target qubits is available for allocation, wherein allocating the plurality of target qubits equal in number to the plurality of source qubits is responsive to determining that the plurality of target qubits is available for allocation.

Example 3 is the method of example 1, wherein allocating the plurality of target qubits includes requesting, by the quantum file manager, allocation of the plurality of target qubits from a specified quantum computing device.

Example 4 is the method of example 1, further including obtaining exclusive access to the plurality of source qubits and the plurality of target qubits.

Example 5 is the method of example 1, further including determining that each source qubit of the plurality of source qubits is in an entanglement state of not entangled, wherein allocating the plurality of target qubits equal in number to the plurality of source qubits is responsive to determining that each source qubit of the plurality of source qubits is in an entanglement state of not entangled.

Example 6 is the method of example 1, further including determining that each source qubit of the plurality of source qubits is not in a state of superposition, wherein allocating the plurality of target qubits equal in number to the plurality of source qubits is responsive to determining that each source qubit of the plurality of source qubits is not in a state of superposition.

Example 7 is the method of example 1, wherein: the target quantum file includes an existing target quantum file, and generating the target quantum file registry record includes updating the target quantum file registry record corresponding to the existing target quantum file to identify the plurality of target qubits and the location of each target qubit of the plurality of target qubits.

Example 8 is the method of example 1, further including verifying the sequence of the plurality of target qubits using a quantum file specification corresponding to the source quantum file.

Example 9 is the method of example 8, wherein the quantum file specification corresponding to the source quantum file includes a Quantum Assembly (QASM) file corresponding to the source quantum file.

Example 10 is the method of example 1, further including, subsequent to generating the target quantum file registry record: deleting the source quantum file registry record, deallocating the plurality of source qubits, and updating the target quantum file registry record to have a same quantum file identifier as the source quantum file registry record.

Example 11 is a quantum computing system that includes a quantum computing device including a memory and at least one processor device coupled to the memory to: receive, by a quantum file manager executing on the at least one processor device, a request to copy a source quantum file including a plurality of source qubits into a target quantum file, access a source quantum file registry record corresponding to the source quantum file, the source quantum file registry record identifying the plurality of source qubits and a location of each source qubit of the plurality of source qubits, allocate a plurality of target qubits equal in number to the plurality of source qubits, copy data stored by each source qubit of the plurality of source qubits to a corresponding target qubit of the plurality of target qubits, and generate a target quantum file registry record corresponding to the target quantum file, the target quantum file registry record identifying the plurality of target qubits and a location of each target qubit of the plurality of target qubits.

Example 12 is the quantum computing system of example 11, wherein: the at least one processor device is further to, prior to allocating the plurality of target qubits, determine that the plurality of target qubits is available for allocation, and the at least one processor device is to allocate the plurality of target qubits equal in number to the plurality of source qubits responsive to determining that the plurality of target qubits is available for allocation.

Example 13 is the quantum computing system of example 11, wherein to allocate the plurality of target qubits is to request, by the quantum file manager, allocation of the plurality of target qubits from a specified quantum computing device.

Example 14 is the quantum computing system of example 11, wherein the at least one processor device is further to obtain exclusive access to the plurality of source qubits and the plurality of target qubits.

Example 15 is the quantum computing system of example 11, wherein: the at least one processor device is further to determine that each source qubit of the plurality of source qubits is in an entanglement state of not entangled, and the at least one processor device is to allocate the plurality of target qubits equal in number to the plurality of source qubits responsive to determining that each source qubit of the plurality of source qubits is in an entanglement state of not entangled.

Example 16 is the quantum computing system of example 11, wherein: the at least one processor device is further to determine that each source qubit of the plurality of source qubits is not in a state of superposition, and the at least one processor device is to allocate the plurality of target qubits equal in number to the plurality of source qubits responsive to determining that each source qubit of the plurality of source qubits is not in a state of superposition.

Example 17 is the quantum computing system of example 11, wherein: the target quantum file includes an existing target quantum file, and to generate the target quantum file registry record is to update the target quantum file registry record corresponding to the existing target quantum file to identify the plurality of target qubits and the location of each target qubit of the plurality of target qubits.

Example 18 is the quantum computing system of example 11, wherein the at least one processor device is further to verify the sequence of the plurality of target qubits using a quantum file specification corresponding to the source quantum file.

Example 19 is the quantum computing system of example 18, wherein the quantum file specification corresponding to the source quantum file includes a Quantum Assembly (QASM) file corresponding to the source quantum file.

Example 20 is the quantum computing system of example 11, wherein the at least one processor device is further to, subsequent to generating the target quantum file registry record: delete the source quantum file registry record, deallocate the plurality of source qubits, and update the target quantum file registry record to have a same quantum file identifier as the source quantum file registry record.

Example 21 is a computer program product including a non-transitory computer-readable medium having stored thereon computer-executable instructions which, when executed, cause a processor device to: receive, by a quantum file manager executing on the processor device, a request to copy a source quantum file including a plurality of source qubits into a target quantum file, access a source quantum file registry record corresponding to the source quantum file, the source quantum file registry record identifying the plurality of source qubits and a location of each source qubit of the plurality of source qubits, allocate a plurality of target qubits equal in number to the plurality of source qubits, copy data stored by each source qubit of the plurality of source qubits to a corresponding target qubit of the plurality of target qubits, and generate a target quantum file registry record corresponding to the target quantum file, the target quantum file registry record identifying the plurality of target qubits and a location of each target qubit of the plurality of target qubits.

Example 22 is the computer program product of example 21, wherein: the computer-executable instructions further cause the processor device to, prior to allocating the plurality of target qubits, determine that the plurality of target qubits is available for allocation, and the computer-executable instructions cause the processor device to allocate the plurality of target qubits equal in number to the plurality of source qubits responsive to determining that the plurality of target qubits is available for allocation.

Example 23 is the computer program product of example 21, wherein to allocate the plurality of target qubits is to request, by the quantum file manager, allocation of the plurality of target qubits from a specified quantum computing device.

Example 24 is the computer program product of example 21, wherein the computer-executable instructions further cause the processor device to obtain exclusive access to the plurality of source qubits and the plurality of target qubits.

Example 25 is the computer program product of example 21, wherein: the computer-executable instructions further cause the processor device to determine that each source qubit of the plurality of source qubits is in an entanglement state of not entangled, and the computer-executable instructions cause the processor device to allocate the plurality of target qubits equal in number to the plurality of source qubits responsive to determining that each source qubit of the plurality of source qubits is in an entanglement state of not entangled.

Example 26 is the computer program product of example 21, wherein: the computer-executable instructions further cause the processor device to determine that each source qubit of the plurality of source qubits is not in a state of superposition, and the computer-executable instructions cause the processor device to allocate the plurality of target qubits equal in number to the plurality of source qubits responsive to determining that each source qubit of the plurality of source qubits is not in a state of superposition.

Example 27 is the computer program product of example 21, wherein: the target quantum file includes an existing target quantum file, and the computer-executable instructions cause the processor device to generate the target quantum file registry record by causing the processor device to update the target quantum file registry record corresponding to the existing target quantum file to identify the plurality of target qubits and the location of each target qubit of the plurality of target qubits.

Example 28 is the computer program product of example 21, wherein the computer-executable instructions further cause the processor device to verify the sequence of the plurality of target qubits using a quantum file specification corresponding to the source quantum file.

Example 29 is the computer program product of example 28, wherein the quantum file specification corresponding to the source quantum file includes a Quantum Assembly (QASM) file corresponding to the source quantum file.

Example 30 is the computer program product of example 21, wherein the computer-executable instructions further cause the processor device to, subsequent to generating the target quantum file registry record: delete the source quantum file registry record, deallocate the plurality of source qubits, and update the target quantum file registry record to have a same quantum file identifier as the source quantum file registry record.

Example 31 is a quantum computing system that includes a receiving means for receiving a request to copy a source quantum file including a plurality of source qubits into a target quantum file, an accessing means for accessing a source quantum file registry record corresponding to the source quantum file, the source quantum file registry record identifying the plurality of source qubits and a location of each source qubit of the plurality of source qubits, an allocating means for allocating a plurality of target qubits equal in number to the plurality of source qubits, a copying means for copying data stored by each source qubit of the plurality of source qubits to a corresponding target qubit of the plurality of target qubits, and a generating means for generating a target quantum file registry record corresponding to the target quantum file, the target quantum file registry record identifying the plurality of target qubits and a location of each target qubit of the plurality of target qubits.

Example 32 is a quantum computing system that includes a receiver for receiving a request to copy a source quantum file including a plurality of source qubits into a target quantum file, an accessor for accessing a source quantum file registry record corresponding to the source quantum file, the source quantum file registry record identifying the plurality of source qubits and a location of each source qubit of the plurality of source qubits, an allocator for allocating a plurality of target qubits equal in number to the plurality of source qubits, a copier for copying data stored by each source qubit of the plurality of source qubits to a corresponding target qubit of the plurality of target qubits, and a generator for generating a target quantum file registry record corresponding to the target quantum file, the target quantum file registry record identifying the plurality of target qubits and a location of each target qubit of the plurality of target qubits.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum file manager executing on at least one processor device, a request to copy a source quantum file comprising a plurality of source qubits into a target quantum file;
   accessing a source quantum file registry record corresponding to the source quantum file, the source quantum file registry record identifying the plurality of source qubits and a location of each source qubit of the plurality of source qubits;
   allocating a plurality of target qubits equal in number to the plurality of source qubits;
   in response to a determination that each of the source qubits of the plurality of qubits is in a non-superposition state, copying data stored by each source qubit of the plurality of source qubits to a corresponding target qubit of the plurality of target qubits;
   generating a target quantum file registry record corresponding to the target quantum file, the target quantum file registry record identifying the plurality of target qubits and a location of each target qubit of the plurality of target qubits; and
   verifying a sequence of the plurality of target qubits using a quantum file specification corresponding to the source quantum file.

2. The method of claim 1, further comprising, prior to allocating the plurality of target qubits, determining that the plurality of target qubits is available for allocation;
   wherein allocating the plurality of target qubits equal in number to the plurality of source qubits is responsive to determining that the plurality of target qubits is available for allocation.

3. The method of claim 1, wherein allocating the plurality of target qubits comprises requesting, by the quantum file manager, allocation of the plurality of target qubits from a specified quantum computing device.

4. The method of claim 1, further comprising obtaining exclusive access to the plurality of source qubits and the plurality of target qubits.

5. The method of claim 1, further comprising:
   causing a determination that each source qubit of the plurality of source qubits is in a non-entangled state;
   wherein allocating the plurality of target qubits equal in number to the plurality of source qubits is response to the determination that each source qubit of the plurality of source qubits is in the non-entangled state.

6. The method of claim 1, further comprising:
   causing the determination that each source qubit of the plurality of source qubits is in the non-superposition state,
   wherein allocating the plurality of target qubits equal in number to the plurality of source qubits is responsive to the determination that each source qubit of the plurality of source qubits is in the non-superposition state.

7. The method of claim 1, wherein:
   the target quantum file comprises an existing target quantum file; and
   generating the target quantum file registry record comprises updating the target quantum file registry record corresponding to the existing target quantum file to identify the plurality of target qubits and the location of each target qubit of the plurality of target qubits.

8. The method of claim 1, wherein the quantum file specification corresponding to the source quantum file comprises a Quantum Assembly (QASM) file corresponding to the source quantum file.

9. The method of claim 1, further comprising, subsequent to generating the target quantum file registry record:
   deleting the source quantum file registry record;
   deallocating the plurality of source qubits; and
   updating the target quantum file registry record to have a same quantum file identifier as the source quantum file registry record.

10. A quantum computing system, comprising:
    a quantum computing device comprising:
    a memory; and
    at least one processor device coupled to the memory to:
    receive, by a quantum file manager executing on the at least one processor device, a request to copy a source quantum file comprising a plurality of source qubits into a target quantum file;
    access a source quantum file registry record corresponding to the source quantum file, the source quantum file registry record identifying the plurality of source qubits and a location of each source qubit of the plurality of source qubits;
    allocate a plurality of target qubits equal in number to the plurality of source qubits;

in response to a determination that each of the source qubits of the plurality of qubits is in a non-superposition state, copy data stored by each source qubit of the plurality of source qubits to a corresponding target qubit of the plurality of target qubits;

generate a target quantum file registry record corresponding to the target quantum file, the target quantum file registry record identifying the plurality of target qubits and a location of each target qubit of the plurality of target qubits; and verify a sequence of the plurality of target qubits using a quantum file specification corresponding to the source quantum file.

11. The quantum computing system of claim 10, wherein:

the at least one processor device is further to, prior to allocating the plurality of target qubits, determine that the plurality of target qubits is available for allocation; and the at least one processor device is to allocate the plurality of target qubits equal in number to the plurality of source qubits responsive to determining that the plurality of target qubits is available for allocation.

12. The quantum computing system of claim 10, wherein to allocate the plurality of target qubits is to request, by the quantum file manager, allocation of the plurality of target qubits from a specified quantum computing device.

13. The quantum computing system of claim 10, wherein the at least one processor device is further to obtain exclusive access to the plurality of source qubits and the plurality of target qubits.

14. The quantum computing system of claim 10, wherein:

the at least one processor device is further to cause a determination that each source qubit of the plurality of source qubits is in a non-entangled state; and the at least one processor device is to allocate the plurality of target qubits equal in number to the plurality of source qubits is in response to the determination that each source qubit of the plurality of source qubits is in the non-entangled state.

15. The quantum computing system of claim 10, wherein:

the at least one processor device is further to cause the determination that each source qubit of the plurality of source qubits is in the non-superposition state; and the at least one processor device is to allocate the plurality of target qubits equal in number to the plurality of source qubits responsive to the determination that each source qubit of the plurality of source qubits is in the non-superposition state.

16. The quantum computing system of claim 10, wherein:

the target quantum file comprises an existing target quantum file; and to generate the target quantum file registry record is to update the target quantum file registry record corresponding to the existing target quantum file to identify the plurality of target qubits and the location of each target qubit of the plurality of target qubits.

17. The quantum computing system of claim 10, wherein the at least one processor device is further to, subsequent to generating the target quantum file registry record:

delete the source quantum file registry record;

deallocate the plurality of source qubits; and update the target quantum file registry record to have a same quantum file identifier as the source quantum file registry record.

18. A computer program product comprising a non-transitory computer-readable medium having stored thereon computer-executable instructions which, when executed, cause a processor device to:

receive, by a quantum file manager executing on the processor device, a request to copy a source quantum file comprising a plurality of source qubits into a target quantum file;

access a source quantum file registry record corresponding to the source quantum file, the source quantum file registry record identifying the plurality of source qubits and a location of each source qubit of the plurality of source qubits;

allocate a plurality of target qubits equal in number to the plurality of source qubits;

in response to a determination that each of the source qubits of the plurality of qubits is in a non-superposition state, copy data stored by each source qubit of the plurality of source qubits to a corresponding target qubit of the plurality of target qubits;

generate a target quantum file registry record corresponding to the target quantum file, the target quantum file registry record identifying the plurality of target qubits and a location of each target qubit of the plurality of target qubits; and verify a sequence of the plurality of target qubits using a quantum file specification corresponding to the source quantum file.

* * * * *